US012688323B2

(12) United States Patent　　(10) Patent No.:　US 12,688,323 B2

McCaa　　(45) Date of Patent:　Jul. 21, 2026

(54) PRE-EXECUTION GOVERNANCE CONTROL LAYER FOR MANAGING ARTIFICIAL INTELLIGENCE SYSTEM ACTIONS

(71) Applicant: Bryan Morton McCaa, Newnan, GA (US)

(72) Inventor: Bryan Morton McCaa, Newnan, GA (US)

( * ) Notice: Subject to any disclaimer, the term of this patent is extended or adjusted under 35 U.S.C. 154(b) by 0 days.

(21) Appl. No.: 19/553,612

(22) Filed: Mar. 2, 2026

(65) Prior Publication Data

US 2026/0195472 A1　　Jul. 9, 2026

Related U.S. Application Data

(63) Continuation-in-part of application No. 19/299,078, filed on Aug. 13, 2025, and a continuation-in-part of application No. 18/783,949, filed on Jul. 25, 2024.

(60) Provisional application No. 63/813,164, filed on May 28, 2025, provisional application No. 63/590,037, filed on Oct. 13, 2023.

(51) Int. Cl.
　H04L 29/06　　　(2006.01)
　G06F 21/62　　　(2013.01)

(52) U.S. Cl.
　CPC ............................... G06F 21/6218 (2013.01)

(58) Field of Classification Search
　CPC ...... G06F 21/6218; G06F 30/27; G06F 18/24; G05B 2219/36542; G05B 2219/33002;
(Continued)

(56) References Cited

U.S. PATENT DOCUMENTS 10,574,638　B2　　2/2020　Tus
11,775,681　B2　　10/2023　Taber
(Continued)

FOREIGN PATENT DOCUMENTS

CN　　　115086075　B　　12/2022
DE　　202025105191　U1　　9/2025
(Continued)

*Primary Examiner* — Edward Zee
*Assistant Examiner* — Leynna Truvan
(74) *Attorney, Agent, or Firm* — Blueshift IP; Robert Plotkin

(57)　　　　　　ABSTRACT

A method, system, and non-transitory computer-readable medium govern execution requests generated by an artificial intelligence system. The method includes intercepting, by a control layer positioned between an artificial intelligence system and an execution system, an execution request generated from an output of the artificial intelligence system, and storing the execution request in a holding state inaccessible to the execution system, wherein the execution system is configured with a default-deny execution posture rejecting execution requests lacking a valid authorization artifact. The method includes classifying the execution request based on governance-relevant attributes to identify a governance handling category, assigning a discrete execution state by applying governance logic, generating an immutable governance record prior to authorization, and generating or withholding the authorization artifact based on the discrete execution state. The method routes deferred requests to an oversight system and enforces machine-enforceable modification constraints.

22 Claims, 2 Drawing Sheets

(58) Field of Classification Search
    CPC .......... G05B 2219/33013; G05B 2219/33027;
                G05D 1/0088; G05D 2101/10; G06Q
                40/03055; G06Q 40/03251; G06Q
                40/0421; G06Q 40/09; G06T 2211/441;
                H01M 8/04992; H04L 9/32; H04L
                9/3228; H04L 41/16; H04L 45/08; H04M
                2203/6081; H04N 21/4665
    See application file for complete search history.

(56)                References Cited

U.S. PATENT DOCUMENTS

| | | | | |
|---|---|---|---|---|
| 11,842,287 | B1 * | 12/2023 | Rosenoer | H04L 63/123 |
| 11,941,014 | B1 * | 3/2024 | Das | G06F 16/219 |
| 12,314,445 | B2 | 5/2025 | Taber | |
| 2022/0414237 | A1 * | 12/2022 | Lally | G06F 21/604 |
| 2025/0225231 | A1 | 7/2025 | Zmijewski | |
| 2025/0247384 | A1 | 7/2025 | Brabble | |
| 2025/0348147 | A1 | 11/2025 | Odeh | |
| 2025/0348562 | A1 | 11/2025 | Odeh | |

FOREIGN PATENT DOCUMENTS

| | | | |
|---|---|---|---|
| IN | 202541041553 | A | 5/2025 |
| IN | 202541077902 | A | 8/2025 |
| IN | 202521068253 | A | 10/2025 |
| IN | 202521068257 | A | 10/2025 |
| IN | 202541084744 | A | 10/2025 |

* cited by examiner

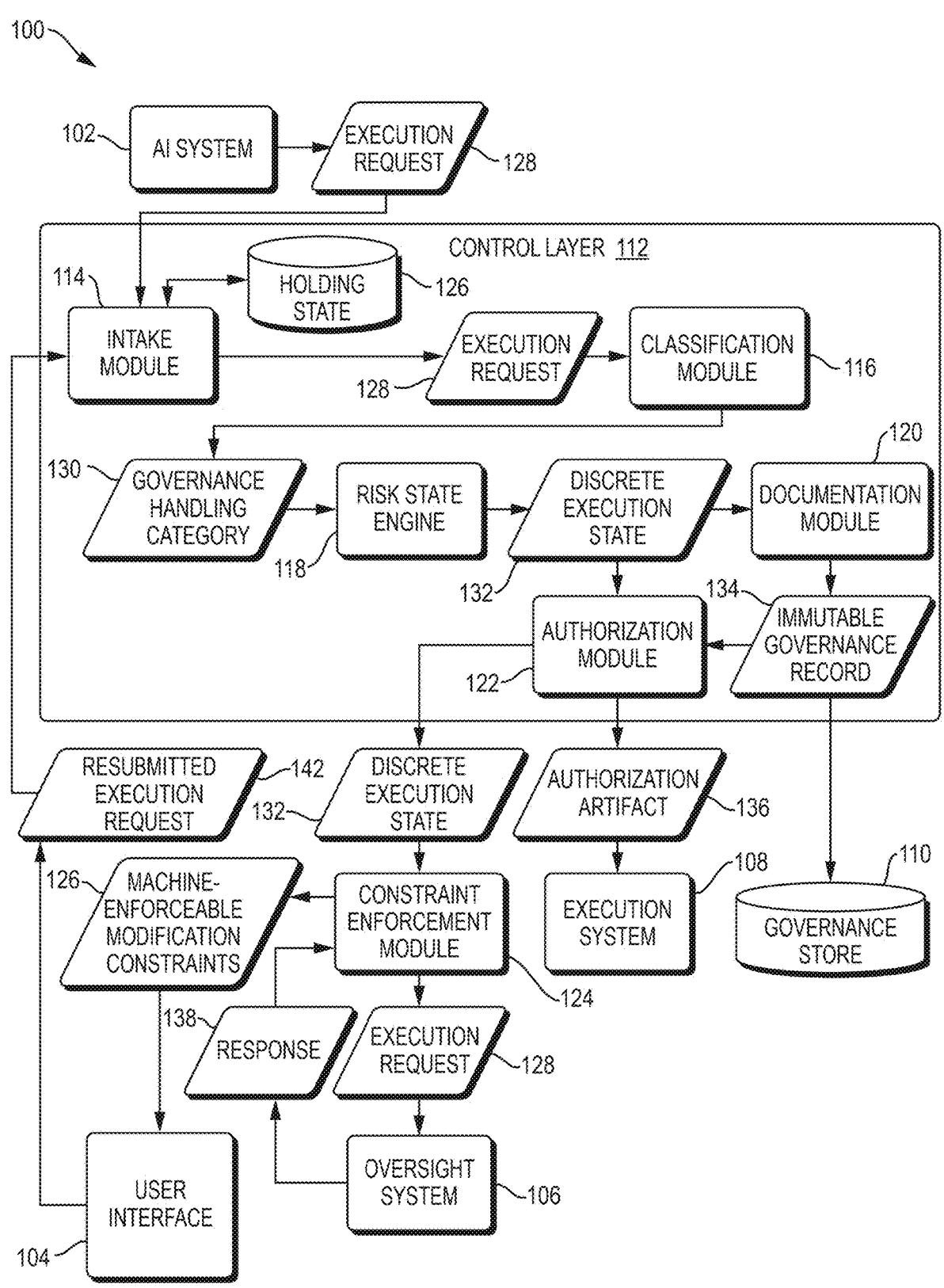

100

102 — AI SYSTEM → EXECUTION REQUEST — 128

CONTROL LAYER 112

114 — INTAKE MODULE

HOLDING STATE — 126

EXECUTION REQUEST — 128 → CLASSIFICATION MODULE — 116

130 — GOVERNANCE HANDLING CATEGORY → RISK STATE ENGINE — 118 → DISCRETE EXECUTION STATE — 132 → DOCUMENTATION MODULE — 120

AUTHORIZATION MODULE — 122 / 134

IMMUTABLE GOVERNANCE RECORD

RESUBMITTED EXECUTION REQUEST — 142 / 132 — DISCRETE EXECUTION STATE

AUTHORIZATION ARTIFACT — 136

126 — MACHINE-ENFORCEABLE MODIFICATION CONSTRAINTS

CONSTRAINT ENFORCEMENT MODULE — 124

EXECUTION SYSTEM — 108

GOVERNANCE STORE — 110

138 — RESPONSE

EXECUTION REQUEST — 128

USER INTERFACE — 104

OVERSIGHT SYSTEM — 106

FIG. 1

PRE-EXECUTION GOVERNANCE CONTROL LAYER FOR MANAGING ARTIFICIAL INTELLIGENCE SYSTEM ACTIONS

BACKGROUND

Artificial intelligence systems are increasingly deployed across computing environments to generate outputs that influence or direct automated actions. These systems analyze data, produce recommendations, classifications, or decisions, and interface with execution components that carry out actions affecting users, resources, and external systems. The integration of AI systems into operational workflows spans numerous domains, including content management, transaction processing, access control, resource allocation, and compliance monitoring.

Traditional approaches to governing AI system behavior have relied on retrospective mechanisms such as audits, logging, bias assessments, and post-deployment reviews. These approaches evaluate AI system outputs and their effects after actions have already been executed by downstream systems. In computing architectures where AI-generated outputs are routed directly to execution components, actions may occur immediately upon output generation without intermediate checkpoints. Retrospective governance mechanisms may identify patterns, anomalies, or policy violations in historical data, but they operate on records of actions that have already produced effects. Because retrospective governance mechanisms operate on records of actions that have already been executed, such mechanisms cannot prevent the initial occurrence of consequences arising from those actions. Additionally, documentation generated after execution records the post-execution state rather than the governance state that existed at the moment of execution, and oversight interventions triggered by retrospective analysis arrive after the window for preventative action has closed.

These limitations present technical challenges in computing architectures that process AI-generated outputs and route those outputs to execution components without intermediate control mechanisms.

SUMMARY

Embodiments of the present invention provide a governance control architecture that intercepts execution requests generated from artificial intelligence system outputs before those requests reach execution systems. A control layer positioned between an AI system and an execution system stores intercepted execution requests in a holding state inaccessible to the execution system. The control layer classifies execution requests based on governance-relevant attributes to identify governance handling categories, assigns discrete execution states by applying governance logic, and generates immutable governance records prior to any authorization. When execution is permitted, the control layer generates a machine-verifiable authorization artifact that the execution system verifies before performing any action. The execution system operates with a default-deny posture that rejects execution requests lacking valid authorization artifacts. When execution is deferred pending oversight, the control layer routes the execution request to an oversight system while maintaining the request in the holding state. The oversight system may approve execution, deny execution, or request modification. When modification is requested, the control layer attaches machine-enforceable modification constraints that are enforced at both the user interface level and the control layer level. Resubmitted execution requests satisfying the modification constraints are processed through the governance steps independently without reusing prior approvals, classifications, or authorizations.

Other features and advantages of various aspects and embodiments of the present invention will become apparent from the following description and from the claims.

BRIEF DESCRIPTION OF THE DRAWINGS

FIG. 1 is a block diagram of a system for governing execution requests generated by an artificial intelligence system according to one embodiment of the present invention.

DETAILED DESCRIPTION

Figure 2:
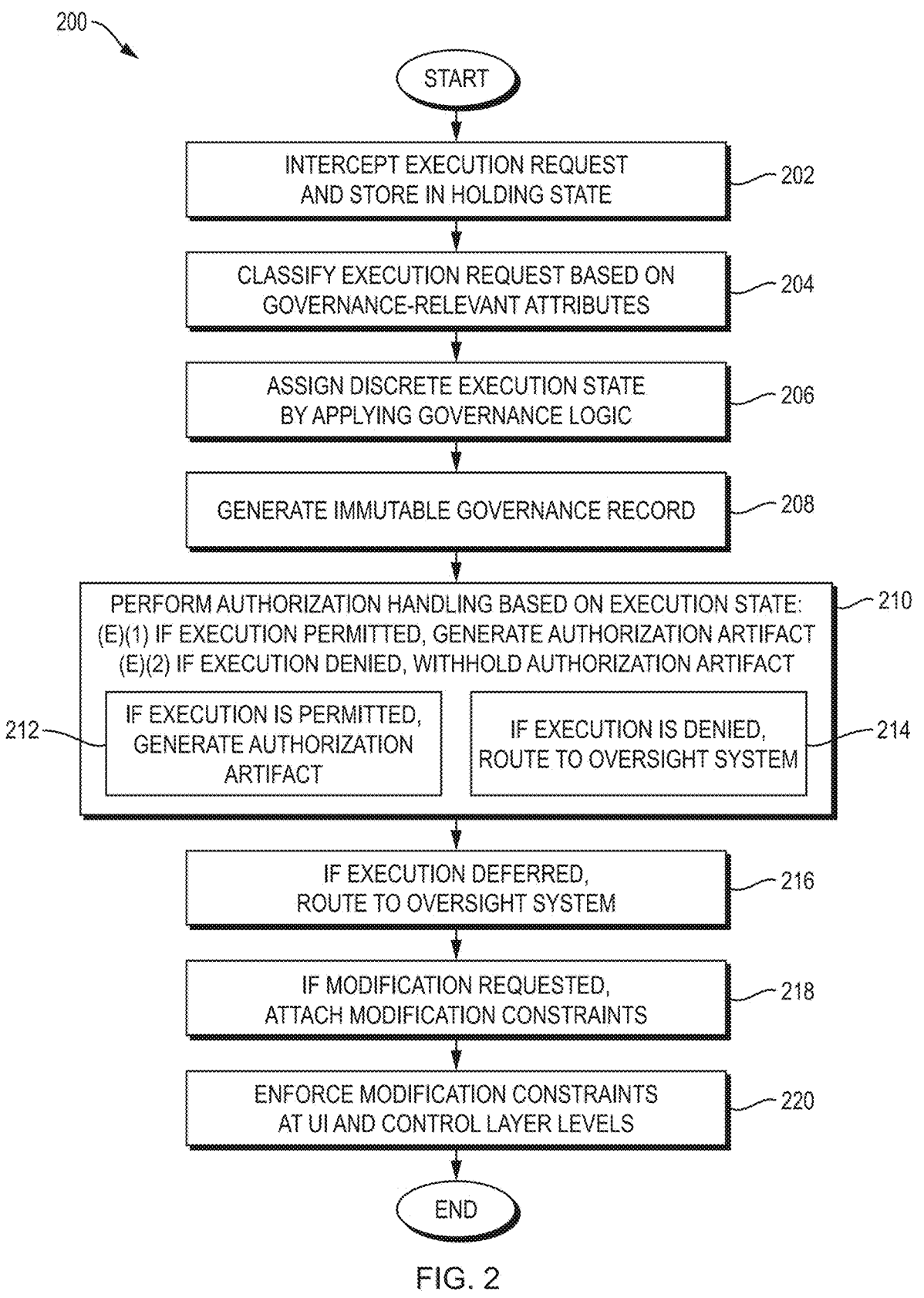
FIG. 2 is a flowchart of a method for governing execution requests generated by an artificial intelligence system according to one embodiment of the present invention.

Artificial intelligence systems increasingly generate outputs that computing platforms interpret as instructions to perform real-world or externally visible actions. In many existing architectures, such outputs are routed directly to execution components, allowing actions to occur immediately without intermediate governance controls. This architectural pattern creates a systemic gap in AI governance.

Existing governance mechanisms for artificial intelligence systems operate after AI systems act, not before execution occurs. Audits, documentation, bias testing, and oversight reviews are typically applied retrospectively. Organizations may evaluate AI system performance, review decision logs, and assess outcomes, but these activities take place after the AI-driven decision has already executed. Once execution has occurred, harm may have already materialized, accountability may have already shifted, and any remediation becomes reactive rather than preventative.

This retrospective approach to AI governance presents several technical and operational challenges. When an AI system generates an output that is immediately executed, there is no opportunity to intercept the action, evaluate governance conditions, or invoke oversight before the action takes effect. For example, if an AI system recommends denying access to a resource, approving a transaction, or publishing content, and the platform immediately executes that recommendation, any governance review occurs only after the denial, approval, or publication has already affected individuals or systems. The effects of execution may be difficult or impossible to reverse, and the window for preventative intervention has closed.

Regulatory frameworks emerging globally now converge on a common expectation: AI systems operating in regulated or risk-bearing environments are to be governed at the point of execution, not merely evaluated after the fact. These frameworks contemplate risk management prior to deployment, technical documentation of decision pathways, human oversight mechanisms capable of intervention, and accountability tied to execution outcomes. The expectation is that governance controls will operate contemporaneously with or prior to execution, rather than as a post-hoc compliance exercise.

However, existing technical architectures for AI systems do not impose a pre-execution control checkpoint that AI systems are required to pass through before acting. AI systems may generate outputs, and those outputs may be executed, without any intervening governance layer that determines whether execution conditions are satisfied. The absence of such a control layer means that governance remains advisory or retrospective, rather than structurally enforced at the point where execution authority is granted or withheld.

The technical problem addressed by embodiments described herein is the lack of a machine-enforced execution control mechanism that prevents AI-initiated actions from reaching execution systems unless governance steps are completed first. Embodiments of the present invention provide an architecture that intercepts AI-initiated execution requests, applies a defined sequence of governance steps, and withholds execution authority unless all steps complete and result in issuance of an explicit authorization artifact. Execution systems are configured in a default-denied posture and may not perform execution unless a valid authorization artifact is received from the control layer. This approach governs execution timing and permission, rather than AI reasoning or output generation, and addresses the gap left by retrospective governance mechanisms.

Embodiments of the present invention provide a governance control architecture that intercepts AI-initiated actions prior to execution. The architecture determines whether execution conditions are satisfied before any action may proceed. Based on the governance state of an execution request, the architecture permits or denies execution. The architecture creates contemporaneous documentation of the decision path, such that a record of governance evaluation exists before execution occurs or is withheld. When execution requests present unresolved governance questions or elevated risk characteristics, the architecture routes those requests to oversight mechanisms for resolution prior to any execution.

The governance control architecture is externally imposed on AI systems. The architecture does not require modification of the AI system itself. An AI system may continue to operate using its existing models, training data, algorithms, and output generation processes. The governance control architecture operates as a separate layer that receives AI-initiated execution requests and governs whether those requests may proceed to execution. The AI system is not altered, retrained, or reconfigured to accommodate the governance control architecture. Instead, the architecture interposes itself between the AI system and execution systems, intercepting execution requests after the AI system generates outputs and before those outputs may be acted upon.

The governance control architecture governs whether outputs may be acted upon, rather than how the AI system produces outputs. In some embodiments, the architecture does not evaluate the correctness, accuracy, or quality of AI-generated outputs. In some embodiments, the architecture does not modify, filter, or alter the content of AI outputs. Instead, the architecture may evaluate governance conditions associated with proposed actions and determine whether execution authority is granted or withheld. The AI system may retain full autonomy over output generation, while the governance control architecture retains authority over execution permission.

The control layer may be agnostic to industry, implementation technology, and jurisdiction. The architecture may be applied to AI systems operating in any domain, including but not limited to content moderation, financial services, healthcare, employment, access control, and resource allocation. The architecture may not depend on any particular machine learning model, training methodology, data structure, or software implementation. The architecture may be deployed in any jurisdiction and may accommodate varying governance rules without requiring changes to the underlying control layer structure. This agnosticism may allow the architecture to function as a general-purpose execution control mechanism applicable across diverse AI deployments.

The control layer may govern execution authority without dictating how the AI system produces outputs. The AI system may employ any algorithm, model architecture, or reasoning process to generate outputs. The control layer may not constrain or influence the AI system's internal operations. The control layer may receive execution requests derived from AI outputs and may apply governance logic to determine execution eligibility. The separation between output generation and execution authority may ensure that AI systems may generate outputs freely, while execution may remain contingent on satisfaction of governance conditions enforced by the control layer.

Under the architecture, AI systems may generate outputs freely but may not execute actions without passing through the control layer. An AI system may produce recommendations, decisions, classifications, or proposed actions without restriction. However, when those outputs are converted into execution requests, the execution requests may be intercepted by the control layer before reaching execution systems. Execution systems may be configured to reject execution requests that lack valid authorization from the control layer. As a result, AI-generated outputs may not produce real-world or externally visible effects unless the control layer has evaluated the execution request, applied governance logic, and issued an authorization artifact permitting execution.

Referring to FIG. 1, a system 100 for governing execution requests generated by an artificial intelligence system is shown according to one embodiment of the present invention. The system 100 includes an AI system 102, a user interface 104, an oversight system 106, an execution system 108, a governance store 110, and a control layer 112. The control layer 112 is positioned between the AI system 102 and the execution system 108. The control layer 112 includes an intake module 114, a classification module 116, a risk state engine 118, a documentation module 120, an authorization module 122, and a constraint enforcement module 124. The control layer 112 further includes a holding state 126 for storing execution requests in a state inaccessible to the execution system 108.

Referring to FIG. 2, a method 200 for governing execution requests generated by an artificial intelligence system is shown according to one embodiment of the present invention. The method 200 may be performed by the system 100 of FIG. 1. The method 200 is performed by at least one computer processor executing computer program instructions stored on at least one non-transitory computer-readable medium. The method 200 includes a sequence of steps that correspond to operations performed by components of the control layer 112.

In operation, the AI system 102 generates an output that is converted into an execution request 128. The execution request 128 represents a proposed action derived from the output of the AI system 102. For example, the AI system 102 may generate an output recommending publication of content, approval of a transaction, denial of access, or allocation of resources. The platform converts the output into the execution request 128, which is a structured, machine-readable data object containing information about the proposed action.

With continued reference to FIG. 1 and FIG. 2, the method 200 begins with step 202, where the control layer 112 intercepts the execution request 128 and stores the execution request 128 in the holding state 126. The intake module 114 performs step 202. The control layer 112 is positioned between the AI system 102 and the execution system 108, and the intake module 114 intercepts the execution request 128 generated from the output of the AI system 102. The intake module 114 stores the execution request 128 in the holding state 126, in which the execution request 128 is inaccessible to the execution system 108. The execution system 108 is configured with a default-deny execution posture that rejects execution requests lacking a valid authorization artifact. As a result, the execution request 128 may not proceed to the execution system 108 while stored in the holding state 126.

The method 200 proceeds to step 204, where the control layer 112 classifies the execution request 128 based on governance-relevant attributes to identify a governance handling category 130 for the execution request 128. The classification module 116 performs step 204. The classification module 116 evaluates attributes of the execution request 128, such as impact domain, affected parties, reversibility, and potential risk exposure. Based on these governance-relevant attributes, the classification module 116 identifies the governance handling category 130 for the execution request 128. The governance handling category 130 characterizes how the execution request 128 is to be governed, without evaluating the correctness or accuracy of the underlying AI output.

The method 200 continues to step 206, where the control layer 112 assigns a discrete execution state 132 to the execution request 128 by applying governance logic to the governance handling category 130. The risk state engine 118 performs step 206. The risk state engine 118 applies governance logic to the governance handling category 130 and assigns the discrete execution state 132 to the execution request 128. The governance logic may be expressed as conditional logic, lookup tables, rule graphs, finite state machines, decision trees, scoring models, machine learning algorithms, or any combination thereof. In some embodiments, the governance logic may comprise governance rules that define explicit mappings between governance handling categories and discrete execution states. The discrete execution state 132 is one of execution permitted, execution denied, or execution deferred pending oversight. The assignment is deterministic, such that a same governance handling category 130 produces a same discrete execution state 132 under same governance logic.

The method 200 then moves to step 208, where the control layer 112 generates an immutable governance record 134 associated with the execution request 128 prior to any authorization of the execution request 128. The documentation module 120 performs step 208. The documentation module 120 creates the immutable governance record 134, which captures the governance classification, the assigned discrete execution state 132, and other governance-relevant information. The immutable governance record 134 is stored in the governance store 110. The governance store 110 may be append-only, separate from execution system logs, and not writable by the AI system 102 or the execution system 108. The authorization artifact is not generated unless the immutable governance record 134 exists, thereby ensuring that documentation precedes any authorization.

As further shown in FIG. 2, the method 200 proceeds to step 210, where the control layer 112 performs authorization handling based on the discrete execution state 132. The authorization module 122 performs step 210. Step 210 includes sub-step 212 and sub-step 214. In sub-step 212, in response to the discrete execution state 132 being execution permitted, the authorization module 122 generates an authorization artifact 136. The authorization artifact 136 is a machine-verifiable data object containing cryptographic or structural verification data that is verified by the execution system 108 before performing any action. The authorization artifact 136 is specific to the execution request 128 and may include validity constraints such as time limits or usage limits. In sub-step 214, in response to the discrete execution state 132 being execution denied, the authorization module 122 withholds the authorization artifact 136, and the execution request 128 remains non-executable.

The method 200 continues to step 216, where, in response to the discrete execution state 132 being execution deferred pending oversight, the control layer 112 routes the execution request 128 to the oversight system 106. The execution request 128 remains in the holding state 126 during oversight. The oversight system 106 receives a resolution bundle containing the execution request 128, the governance handling category 130, the discrete execution state 132, and the immutable governance record 134. The oversight system 106 may not directly execute actions and may not issue authorization artifacts. The oversight system 106 may only return a response 138 to the control layer 112. The response 138 comprises one of approve execution, deny execution, or request modification.

With continued reference to FIG. 1 and FIG. 2, the control layer 112 validates the response 138 from the oversight system 106 before processing the response 138. The validation may include verifying that the execution request 128 is currently in a deferred execution state, verifying that the response 138 conforms to a defined response schema, verifying that a responder associated with the response 138 is authorized to issue oversight responses, or verifying that the response 138 has not been duplicated, altered, or replayed. If the validation fails, the control layer 112 discards the response 138 and maintains the execution request 128 in the holding state 126.

The method 200 then moves to step 218, where, in response to the response 138 being request modification, the control layer 112 attaches machine-enforceable modification constraints 140 to the execution request 128. The constraint enforcement module 124 performs step 218. The machine-enforceable modification constraints 140 may comprise two or more of prohibited elements, required removals, mandatory scope restrictions, and required disclosures. The machine-enforceable modification constraints 140 are bound to the execution request 128 and define conditions that a resubmitted execution request 142 is to satisfy before re-entering the governance pipeline.

The method 200 proceeds to step 220, where the control layer 112 enforces the machine-enforceable modification constraints 140 at a user interface level and at the control layer level. The user interface 104 receives the machine-enforceable modification constraints 140 and enforces the machine-enforceable modification constraints 140 at the user interface level by blocking submission of a resubmitted execution request 142 that does not satisfy the machine-enforceable modification constraints 140. For example, the user interface 104 may disable prohibited submission options, prevent selection of disallowed execution scopes, or block submission if constraints are unmet. The constraint enforcement module 124 enforces the machine-enforceable modification constraints 140 at the control layer 112 by rejecting a resubmitted execution request 142 that does not satisfy the machine-enforceable modification constraints 140. The intake module 114 may reject the resubmitted execution request 142 before assigning a unique identifier to the resubmitted execution request 142.

In response to receiving a resubmitted execution request 142 that satisfies the machine-enforceable modification constraints 140, the control layer 112 performs step 202, step 204, step 206, step 208, and step 210 on the resubmitted execution request 142. The resubmitted execution request 142 is intercepted by the intake module 114, classified by the classification module 116, assigned a discrete execution state 132 by the risk state engine 118, documented by the documentation module 120, and processed for authorization by the authorization module 122. No prior approval, classification, or authorization from the original execution request 128 is reused for the resubmitted execution request 142.

When the response 138 is approve execution, the control layer 112 proceeds to generate the authorization artifact 136 permitting execution of the execution request 128. When the response 138 is deny execution, the control layer 112 permanently withholds the authorization artifact 136 and marks the execution request 128 as non-executable. The execution system 108 verifies the authorization artifact 136 before performing any action. If the execution system 108 does not receive a valid authorization artifact 136, the execution system 108 rejects the execution request 128 in accordance with the default-deny execution posture.

The intake module 114 may intercept execution requests generated from outputs of the AI system 102 and may store the execution requests in the holding state 126 where the execution requests may be inaccessible to the execution system 108. The intake module 114 may perform step 202 of the method 200 of FIG. 2. The intake module 114 may operate as the first control point in the governance architecture, ensuring that AI-initiated actions may not reach execution systems without passing through the control layer 112.

When the AI system 102 generates an output, the platform may convert the output into a structured execution request 128 through a deterministic conversion process. The conversion process may not involve governance decisions. The conversion process may transform the AI output into a machine-readable data object suitable for governance evaluation. The execution request 128 may contain a requested action type identifying what action is proposed, such as publish content, deny access, approve a transaction, trigger a notification, or allocate resources. The execution request 128 may contain a target identifier specifying what the action applies to, such as a content item, user account, transaction record, or resource allocation target. The execution request 128 may contain an execution scope identifying who or what will be affected by the proposed action, such as a single individual, a defined group, a broad public population, or an organizational unit. The execution request 128 may contain a source system identifier indicating which AI system generated the output. The execution request 128 may contain a timestamp indicating when the request was created.

Platform architecture may prohibit routing execution requests directly to execution systems. The intake interface of the control layer 112 may be the sole system endpoint authorized to receive execution requests originating from AI systems. Execution requests generated from AI outputs may be routed exclusively to the intake module 114 rather than to the execution system 108. This routing configuration may ensure that the control layer 112 intercepts all AI-initiated execution requests before any execution may occur.

The control layer intake interface may be implemented in various forms. In some embodiments, the control layer intake interface may be implemented as an API endpoint that may receive execution requests from AI systems. In some embodiments, the control layer intake interface may be implemented as a message queue consumer that may receive execution requests from AI systems. In some embodiments, the control layer intake interface may be implemented as a command gateway that may receive execution requests from AI systems. In some embodiments, the control layer intake interface may be implemented as an event ingestion service that may receive execution requests from AI systems. Regardless of the implementation form, the intake interface may be positioned between the AI system 102 and the execution system 108.

Upon receiving the execution request 128, the control layer 112 may assign a unique identifier to the execution request 128. The unique identifier may be referred to as a ControlID. The ControlID may bind the execution request 128 to the governance process and may allow tracking of the execution request 128 through subsequent governance steps. As part of step 202, the control layer 112 may store the execution request 128 in the holding state 126 and may mark the execution request 128 as execution-ineligible. Marking the execution request 128 as execution-ineligible may indicate that the execution request 128 may not proceed to execution without completing subsequent governance steps and receiving an authorization artifact 136 from the authorization module 122.

The holding state 126 may be implemented in various forms. In some embodiments, the holding state 126 may be implemented as a queue managed by the control layer 112. In some embodiments, the holding state 126 may be implemented as a table managed by the control layer 112. In some embodiments, the holding state 126 may be implemented as a state store managed by the control layer 112. Regardless of the implementation form, the holding state 126 may be owned exclusively by the control layer 112 and may be inaccessible to the execution system 108. While stored in the holding state 126, the execution request 128 may not be forwarded to the execution system 108, may not be accessed by the execution system 108, and may not be executed.

In some embodiments, when an execution request 128 targets an action that would trigger another AI system to generate outputs, the control layer 112 may intercept execution requests 128 at each AI-to-AI boundary. Each AI system in a chain may have its execution requests 128 independently intercepted by the intake module 114 and stored in the holding state 126. The holding state 126 for each execution request 128 may be maintained independently, such that an execution request 128 from a first AI system and an execution request 128 from a second AI system triggered by the first AI system may reside in the holding state 126 simultaneously or sequentially. This configuration may ensure that governance evaluation occurs at each AI-to-AI boundary before any downstream AI system may act on an authorized execution from an upstream AI system.

The AI system 102 may comprise various types of automated computational systems that may produce outputs interpretable as proposed actions. In some embodiments, the AI system 102 may comprise a content ranking system that may produce outputs interpretable as proposed actions. A content ranking system may evaluate content items and may generate outputs indicating how content items may be ordered, prioritized, or surfaced to users. The outputs of a content ranking system may be converted into execution requests 128 proposing actions such as displaying content in a particular position, promoting content to a broader audience, or suppressing content from visibility. Such execution requests 128 may be intercepted by the intake module 114 in step 202 of the method 200 of FIG. 2.

In some embodiments, the AI system 102 may comprise a recommendation engine that may produce outputs interpretable as proposed actions. A recommendation engine may analyze user behavior, preferences, or contextual information and may generate outputs suggesting products, services, content, or connections to present to users. The outputs of a recommendation engine may be converted into execution requests 128 proposing actions such as presenting a recommendation to a user, adding an item to a user's feed, or initiating a notification about a suggested item. The control layer 112 may intercept such execution requests 128 and may store them in the holding state 126 as part of step 202.

In some embodiments, the AI system 102 may comprise a moderation classifier that may produce outputs interpretable as proposed actions. A moderation classifier may evaluate content, communications, or user behavior and may generate outputs indicating whether items comply with policies or present risks. The outputs of a moderation classifier may be converted into execution requests 128 proposing actions such as removing content, restricting user access, issuing warnings, or escalating items for review. The classification module 116 may classify such execution requests 128 in step 204 to identify a governance handling category 130.

In some embodiments, the AI system 102 may comprise a generative model that may produce outputs interpretable as proposed actions. A generative model may produce text, images, audio, code, or other content in response to prompts or inputs. The outputs of a generative model may be converted into execution requests 128 proposing actions such as publishing generated content, sending generated communications, or incorporating generated elements into user-facing interfaces. The risk state engine 118 may assign a discrete execution state 132 to such execution requests 128 in step 206.

In some embodiments, the AI system 102 may comprise a decision support system that may produce outputs interpretable as proposed actions. A decision support system may analyze data and may generate outputs providing recommendations or determinations to support human or automated decision-making. The outputs of a decision support system may be converted into execution requests 128 proposing actions such as approving applications, denying requests, flagging items for attention, or triggering downstream processes. The documentation module 120 may generate an immutable governance record 134 for such execution requests 128 in step 208.

In some embodiments, the AI system 102 may comprise an automated approval engine that may produce outputs interpretable as proposed actions. An automated approval engine may evaluate requests, applications, or transactions against criteria and may generate outputs indicating approval or denial determinations. The outputs of an automated approval engine may be converted into execution requests 128 proposing actions such as granting access, authorizing transactions, issuing credentials, or rejecting submissions. The authorization module 122 may process such execution requests 128 in step 210, generating an authorization artifact 136 when the discrete execution state 132 may be execution permitted.

The proposed actions generated by AI systems may include decisions affecting individuals, resources, access, safety, employment, finance, or health. For example, proposed actions may affect individuals by determining what content individuals may see, what recommendations individuals may receive, or what communications individuals may receive. Proposed actions may affect resources by determining how resources may be allocated, distributed, or prioritized. Proposed actions may affect access by determining whether individuals or entities may be granted or denied access to systems, services, locations, or information. Proposed actions may affect safety by determining task assignments, hazard responses, or protective measures. Proposed actions may affect employment by determining hiring recommendations, performance evaluations, or work assignments. Proposed actions may affect finance by determining transaction approvals, credit decisions, or fraud determinations. Proposed actions may affect health by determining treatment recommendations, diagnostic outputs, or care prioritization. When such proposed actions may present elevated risk characteristics, the control layer 112 may route the corresponding execution requests 128 to the oversight system 106 in step 216 for resolution prior to any execution.

In some embodiments, the execution system 108 may itself comprise or trigger another AI system. When an authorized execution request 128 results in an action that triggers another AI system to generate outputs, those outputs may also be converted into execution requests 128. The control layer 112 may intercept execution requests 128 at each AI-to-AI boundary. Each AI system in a chain may have its execution requests 128 independently intercepted by the intake module 114 in step 202 of the method 200 of FIG. 2, classified by the classification module 116 in step 204, assigned a discrete execution state 132 by the risk state engine 118 in step 206, documented by the documentation module 120 in step 208, and processed for authorization by the authorization module 122 in step 210. This configuration may ensure that the governance architecture applies to AI-initiated execution requests 128 regardless of whether the execution target is a conventional execution system or another AI system.

The classification module 116 may classify the execution request 128 based on governance-relevant attributes to identify the governance handling category 130 for the execution request 128. The classification module 116 may perform step 204 of the method 200 of FIG. 2. Classification may occur after the intake module 114 has intercepted the execution request 128 and stored the execution request 128 in the holding state 126 in step 202. Classification may determine how tightly an execution request 128 is to be governed before the execution request 128 may be allowed to execute. Classification may not determine whether an action is correct, accurate, lawful, or desirable. Classification may determine what level of governance control is applied before execution is possible.

The governance-relevant attributes may comprise any one or more attributes relevant to governance evaluation, in any combination. Examples of governance-relevant attributes include, but are not limited to, impact domain, affected parties, reversibility, potential risk exposure, action type, execution scope, jurisdictional context, regulatory classification, sensitivity level, temporal urgency, data classification, consent status, audit requirements, escalation thresholds, and/or organizational policy indicators. In some embodiments, the governance-relevant attributes may comprise at least one of impact domain, affected parties, reversibility, and potential risk exposure. In some embodiments, the governance-relevant attributes may comprise additional or alternative attributes beyond those specifically enumerated herein. The classification module 116 may evaluate any suitable governance-relevant attributes to characterize the execution request 128 for governance purposes.

Impact domain may identify what area of human or organizational activity the execution would affect if allowed. Examples of impact domains may include, but are not limited to, public discourse, health or medical decisions, financial transactions, employment decisions, access control, physical safety, content moderation, resource allocation, educational assessments, legal determinations, insurance underwriting, credit decisions, housing eligibility, transportation routing, energy distribution, supply chain management, customer service interactions, and/or regulatory compliance. The foregoing examples are illustrative only and do not constitute limitations of the present invention. Impact domain may answer the question of what kind of real-world domain is affected if the action executes. Different impact domains may require different levels of governance.

Affected parties may identify who could experience consequences if the execution occurs. Examples of affected parties may include, but are not limited to, a single individual, a defined group, a broad or public population, an organization or institution, employees, customers, patients, students, applicants, account holders, content creators, end users, third-party service providers, regulatory bodies, community members, and/or any combination thereof. The foregoing examples are illustrative only and do not constitute limitations of the present invention. Affected parties may answer the question of how many people, and what types of people, could be impacted by the execution. Higher numbers or broader categories of affected parties may increase governance requirements.

Reversibility may describe how easily the effects of execution may be undone once execution occurs. Examples of reversibility characterizations may include, but are not limited to, fully reversible, partially reversible, and/or practically irreversible. The foregoing examples are illustrative only and do not constitute limitations of the present invention. In some embodiments, reversibility may be characterized using additional or alternative characterizations beyond those specifically enumerated herein, in any combination. Reversibility may answer the question of whether the effects may realistically be undone if execution turns out to be improper. Low reversibility may increase the need for pre-execution control.

Potential risk exposure may be a procedural assessment of governance risk. Examples of factors that may be considered in assessing potential risk exposure include, but are not limited to, scale of impact, sensitivity of context, legal or regulatory exposure, reputational consequences, and/or systemic amplification risk. The foregoing examples are illustrative only and do not constitute limitations of the present invention. In some embodiments, potential risk exposure may be assessed using additional or alternative factors beyond those specifically enumerated herein, in any combination. Potential risk exposure may answer the question of how serious the consequences would be if the execution were improper. Potential risk exposure may not assess likelihood of harm. Potential risk exposure may assess governance severity.

The classification module 116 may evaluate governance-relevant metadata without fetching new data from execution systems. The inputs used for classification may be already present in the execution request 128 created prior to intake. The classification module 116 may read governance-relevant metadata from the execution request 128. Examples of governance-relevant metadata include, but are not limited to, requested action type, execution scope, target object type, context metadata, jurisdiction indicators, category tags, and/ or system source. The foregoing examples are illustrative only and do not constitute limitations of the present invention. In some embodiments, the governance-relevant metadata may comprise additional or alternative metadata beyond those specifically enumerated herein, in any combination. The classification module 116 may not retrieve additional data from the execution system 108 or from external sources during classification. This approach may ensure that classification operates on information already captured at intake in step 202.

The classification module 116 may apply predefined governance classification logic to the governance-relevant attributes. The governance classification logic may map classification attributes to governance handling categories. The governance classification logic may be expressed as conditional logic, lookup tables, rule graphs, and/or finite state machines. The governance classification logic may be stable at runtime and may not be modified by the AI system 102.

The classification module 116 may produce a governance classification object bound to the execution request 128. The governance classification object may include the unique identifier assigned to the execution request 128, the impact domain, the affected party category, the reversibility level, the potential risk exposure level, and/or the governance handling category 130. The governance classification object produced by the classification module 116 may be immutable once created. The governance classification object may not be altered after creation. The governance classification object may be passed internally to the risk state engine 118 for use in step 206 of the method 200 of FIG. 2.

Classification may transform the execution request 128 into a governance-aware execution request. The governance handling category 130 may characterize how the execution request 128 is to be handled in subsequent governance steps, such as step 206, step 208, and/or step 210 of the method 200 of FIG. 2. Classification may not evaluate correctness of the AI output. Classification may not assess whether the proposed action is true, accurate, or optimal. Classification may evaluate how the action is to be governed, not whether the action is right. This separation between correctness evaluation and governance characterization may allow the control layer 112 to govern execution without making judgments about AI output quality.

The risk state engine 118 may apply governance logic to the governance handling category 130 to assign a discrete execution state 132 to the execution request 128. As described previously, the risk state engine 118 may perform step 206 of the method 200 of FIG. 2. The risk state engine 118 may be a component of the control layer 112 of the system 100 of FIG. 1. The risk state engine 118 may consume the governance classification object produced by the classification module 116 in step 204 and may apply predefined governance logic to determine execution eligibility.

The discrete execution state 132 assigned by the risk state engine 118 may be one of execution permitted, execution denied, or execution deferred pending oversight. These execution states may be mutually exclusive. The risk state engine 118 may assign one and only one discrete execution state 132 to each execution request 128. The discrete execution state 132 may determine whether execution may ever be authorized, whether oversight routing is required in step 216, and/or whether authorization issuance is prohibited in step 214.

The governance logic applied by the risk state engine 118 may comprise governance rules. The governance rules may define explicit mappings between governance handling categories and discrete execution states. The governance rules may be established prior to runtime and may be stable during operation. The AI system 102 may not modify the governance rules. The governance rules may operate as a deterministic state resolver, such that the risk state engine 118 may not learn, predict, or infer execution eligibility. Instead, the risk state engine 118 may apply the governance rules to the governance handling category 130 to produce the discrete execution state 132.

The governance rules may be expressed as conditional logic for mapping classification attributes to execution states. Conditional logic may evaluate governance handling category attributes and may apply branching conditions to determine the appropriate discrete execution state 132. For example, conditional logic may evaluate whether potential risk exposure is high and whether reversibility is low, and may assign execution deferred pending oversight when both conditions are satisfied.

The governance rules may be expressed as lookup tables for mapping classification attributes to execution states. Lookup tables may define direct mappings between combinations of governance handling category attributes and discrete execution states. The risk state engine 118 may receive the governance handling category 130, may identify the corresponding entry in the lookup table, and may retrieve the associated discrete execution state 132.

The governance rules may be expressed as rule graphs for mapping classification attributes to execution states. Rule graphs may represent governance rules as nodes and edges, where nodes may represent governance conditions or execution states and edges may represent transitions between conditions. The risk state engine 118 may traverse the rule graph based on the governance handling category 130 to arrive at the appropriate discrete execution state 132.

The governance rules may be expressed as finite state machines for mapping classification attributes to execution states. Finite state machines may define a set of states and transitions, where the governance handling category 130 may determine which transitions are taken. The risk state engine 118 may process the governance handling category 130 through the finite state machine to reach a terminal state corresponding to the discrete execution state 132.

A same governance handling category 130 may produce a same discrete execution state 132 under same predefined governance rules. The deterministic nature of the governance rules may ensure that identical governance handling categories may result in identical discrete execution states when the same governance rules are applied. This determinism may allow for predictable and repeatable governance outcomes.

The risk state engine 118 may produce a risk state object bound to the execution request 128. The risk state object may include the unique identifier assigned to the execution request 128, the assigned discrete execution state 132, and a timestamp. The risk state object may include rule identifiers that triggered the assigned state. The rule identifiers may indicate which governance rules were applied to produce the discrete execution state 132. The rule identifiers may provide traceability between the governance handling category 130 and the resulting discrete execution state 132. The risk state object may be immutable once created.

The risk state determination step may answer the question of whether the execution request 128 is permitted to execute under the applicable governance conditions. The risk state determination step may not answer whether the AI output is correct, whether the content is true, whether the action is optimal, or whether harm is likely. The risk state determination step may control execution eligibility rather than judgment quality. The discrete execution state 132 produced by the risk state engine 118 may be passed to the documentation module 120 for use in step 208 of the method 200 of FIG. 2 and to the authorization module 122 for use in step 210 of the method 200 of FIG. 2.

The documentation module 120 may generate an immutable governance record 134 associated with the execution request 128 prior to any authorization of the execution request 128. As described previously, the documentation module 120 may perform step 208 of the method 200. The documentation module 120 may create the immutable governance record 134 after the risk state engine 118 has assigned the discrete execution state 132 to the execution request 128 in step 206 and before the authorization module 122 processes the execution request 128 in step 210. The authorization artifact 136 is not generated unless the immutable governance record 134 exists. This dependency may ensure that documentation precedes any authorization and that no execution may occur without a corresponding governance record.

The immutable governance record 134 may be stored in the governance store 110. The governance store 110 may be append-only, separate from execution system logs, and not writable by the AI system 102 or the execution system 108. The append-only configuration of the governance store 110 may ensure that governance records may be added but may not be modified or deleted after creation. The separation of the governance store 110 from execution system logs may ensure that governance records are maintained independently of operational logs generated by the execution system 108. The restriction preventing the AI system 102 and the execution system 108 from writing to the governance store 110 may ensure that governance records are created exclusively by the control layer 112.

The governance store 110 may be configured as write-once to prevent modification of governance records. A write-once configuration may ensure that once the immutable governance record 134 is written to the governance store 110, the immutable governance record 134 may not be altered, overwritten, or deleted. The write-once configuration may provide tamper resistance and may preserve the integrity of governance records over time. The write-once configuration may support audit and verification activities by ensuring that governance records reflect the governance state at the time of creation without subsequent modification.

The immutable governance record 134 may include various fields capturing the governance status of the execution request 128 at the time of documentation. The immutable governance record 134 may include the unique identifier assigned to the execution request 128, the execution request identifier, the governance classification attributes produced by the classification module 116, the discrete execution state 132 assigned by the risk state engine 118, rule identifiers indicating which governance rules were applied during classification and risk state determination, a timestamp indicating creation prior to execution, and/or a system identifier of the control layer 112.

The immutable governance record 134 may include governance policy version identifiers for traceability. Governance policy version identifiers may indicate which version of governance policies, rules, and/or configurations were in effect when the governance record was created. Governance policy version identifiers may allow subsequent review to determine what governance logic was applied to the execution request 128 at the time of documentation. Governance policy version identifiers may support traceability by linking the governance record to specific policy versions.

The immutable governance record 134 may include oversight requirement indicators. Oversight requirement indicators may indicate whether the execution request 128 requires routing to the oversight system 106 prior to authorization. Oversight requirement indicators may reflect the discrete execution state 132 assigned by the risk state engine 118, such as when the discrete execution state 132 is execution deferred pending oversight. Oversight requirement indicators may provide a record of whether oversight was invoked for a particular execution request 128.

The immutable governance record 134 may include chain-of-custody information linking related execution requests 128 across multiple AI systems. Chain-of-custody information may include a reference to a prior ControlID from an upstream execution request 128 that triggered the current execution request 128. Chain-of-custody information may include an indication that the execution request 128 was generated as a result of a prior authorized execution. Chain-of-custody information may include a chain depth indicator indicating the position of the execution request 128 within a sequence of AI-to-AI execution requests 128. In some embodiments, the chain-of-custody information may comprise additional or alternative information beyond those specifically enumerated herein. Chain-of-custody information may support traceability across AI-to-AI boundaries by linking governance records 134 for related execution requests 128 that form part of a common execution chain.

The immutable governance record 134 may include jurisdiction references for regulatory context. Jurisdiction references may identify the geographic, legal, and/or regulatory jurisdiction associated with the execution request 128. Jurisdiction references may indicate which regulatory frameworks and/or jurisdictional requirements may be relevant to the governance evaluation. Jurisdiction references may support regulatory context by linking the governance record to applicable jurisdictional considerations.

The immutable governance record 134 may be a structured, timestamped data object bound to the unique identifier of the execution request 128. The immutable governance record 134 may not be a narrative explanation and/or a human-authored memo. The structured format of the immutable governance record 134 may allow machine verification and/or automated audit processes. The timestamp may indicate that the governance record was created prior to any authorization, thereby establishing that governance evaluation occurred before execution was permitted and/or denied.

The documentation step may create pre-execution traceability. The immutable governance record 134 may provide proof that governance controls were applied before execution was allowed and/or denied. The existence of the immutable governance record 134 may be a prerequisite to generation of the authorization artifact 136 by the authorization module 122. The authorization module 122 may verify that the immutable governance record 134 exists before generating the authorization artifact 136. If the immutable governance record 134 does not exist, the authorization module 122 may not generate the authorization artifact 136, and execution may remain blocked.

The authorization module 122 may generate the authorization artifact 136 when the discrete execution state 132 is execution permitted, and may withhold the authorization artifact 136 when the discrete execution state 132 is execution denied. As described previously, the authorization module 122 may perform step 210 of the method 200. The authorization module 122 may receive the discrete execution state 132 from the risk state engine 118 and may verify that the immutable governance record 134 exists before proceeding with authorization handling. The authorization module 122 may make execution physically possible or permanently impossible based on the discrete execution state 132.

The authorization artifact 136 may be a machine-verifiable data object containing cryptographic or structural verification data that is verified by the execution system 108 before performing any action. The authorization artifact 136 may not be a policy statement, a log entry, or a recommendation. The authorization artifact 136 may function as a required execution credential. Without the authorization artifact 136, the execution system 108 may be incapable of acting due to the default-deny execution posture. The execution system 108 may mathematically verify that the authorization artifact 136 originated from the control layer 112, that the authorization artifact 136 matches the execution request 128, and that the authorization artifact 136 has not expired or been altered.

The authorization artifact 136 may be specific to the execution request 128. The authorization artifact 136 may contain the unique identifier assigned to the execution request 128, the execution request identifier, the permitted action type, the permitted target object, and the permitted execution scope. The authorization artifact 136 may include an issuer identifier indicating the control layer 112 as the source of the authorization. The authorization artifact 136 may not be reused for other execution requests. Each execution request 128 that receives authorization may receive a distinct authorization artifact 136 bound to that specific execution request 128.

The authorization artifact 136 may be non-transferable between AI systems in a chain. An authorization artifact 136 generated for a first execution request 128 targeting a first AI system may not authorize execution requests 128 generated by downstream AI systems. Each AI system in a chain may have its execution requests 128 independently authorized through the governance steps. Authorization artifacts 136 generated for upstream execution requests 128 may not be reused, inherited, or propagated to authorize downstream execution requests 128. This non-transferability may ensure that each AI-to-AI boundary requires independent governance evaluation and independent authorization before any downstream AI system may act on outputs triggered by an upstream authorized execution.

The authorization artifact 136 may comprise validity constraints including at least one of time limits or usage limits. Time limits may specify a temporal window during which the authorization artifact 136 remains valid. Examples of time limits include, but are not limited to, expiration after a fixed duration from issuance (such as 30 seconds, 1 minute, 5 minutes, 15 minutes, 1 hour, 24 hours, or 7 days), expiration at a specific absolute timestamp, expiration at the end of a defined session, expiration at the end of a business day or operational period, and/or expiration upon occurrence of a triggering event such as system restart or policy update. After the time limit expires, the authorization artifact 136 may no longer be accepted by the execution system 108, and execution may be blocked. Usage limits may specify how many times the authorization artifact 136 may be used to authorize execution. Examples of usage limits include, but are not limited to, single-use authorization (permitting exactly one execution attempt), limited-use authorization (permitting a specified number of execution attempts such as 2, 3, 5, or 10 attempts), batch-limited authorization (permitting execution for a defined batch size or number of affected records), scope-limited authorization (permitting execution only within a defined scope such as a single user, a defined group, or a specific resource), and/or rate-limited authorization (permitting a maximum number of executions within a defined time period). After the usage limit is reached, the authorization artifact 136 may no longer be accepted by the execution system 108. Validity constraints may ensure that authorization artifacts do not remain valid indefinitely and may limit the window during which execution may occur.

The authorization artifact 136 may be implemented as a signed authorization token containing cryptographic verification data. A signed authorization token may include the execution details the token permits and may contain a digital signature generated by the control layer 112. The digital signature may allow the execution system 108 to verify that the token originated from the control layer 112 and has not been modified. The signed authorization token may be transmitted to the execution system 108, which may verify the digital signature before performing any action.

The authorization artifact 136 may be implemented as a cryptographically signed permit object. A cryptographically signed permit object may encapsulate the authorization details in a structured format and may include cryptographic signatures that bind the permit to the specific execution request 128. The cryptographic signatures may prevent tampering and may allow verification of authenticity. The execution system 108 may validate the cryptographic signatures before accepting the permit object and proceeding with execution.

The authorization artifact 136 may be implemented as a capability grant bound to a ControlID. A capability grant may represent a specific permission to perform a defined action on a defined target. The capability grant may be bound to the unique identifier assigned to the execution request 128, ensuring that the capability applies only to that specific execution request 128. The capability grant may not be transferred to other execution requests and may not be used to authorize actions beyond the scope defined in the grant.

The authorization artifact 136 may be implemented as a short-lived execution credential with temporal validity constraints. A short-lived execution credential may have a limited lifespan, after which the credential expires and may no longer authorize execution. Examples of limited lifespans include, but are not limited to, 30 seconds, 1 minute, 5 minutes, 15 minutes, 30 minutes, 1 hour, 4 hours, 8 hours, 24 hours, or 7 days. The temporal validity constraints may be embedded in the credential and may be verified by the execution system 108 before accepting the credential. Short-lived execution credentials may reduce the risk of stale authorizations persisting beyond their intended validity period.

The authorization artifact 136 may contain a digital signature that cannot be altered without invalidation. The digital signature may be generated using cryptographic techniques that bind the signature to the contents of the authorization artifact 136. If any portion of the authorization artifact 136 is modified after the digital signature is generated, the digital signature may become invalid. The execution system 108 may detect such invalidation during verification and may reject the authorization artifact 136. This property may ensure that authorization artifacts may not be forged or tampered with by the AI system 102, the execution system 108, or other systems.

When the discrete execution state 132 is execution denied, the authorization module 122 may permanently withhold the authorization artifact 136. In some embodiments, no authorization artifact 136 may ever be generated for an execution request 128 with a discrete execution state 132 of execution denied. The execution request 128 may remain in the holding state 126 and may be marked as non-executable. In some embodiments, the execution system 108 may never receive a valid authorization artifact 136 for the denied execution request 128, and execution may remain permanently blocked.

When the discrete execution state 132 assigned by the risk state engine 118 may be execution deferred pending oversight, the control layer 112 may route the execution request 128 to the oversight system 106 for resolution prior to any authorization. The execution request 128 may remain in the holding state 126 during oversight. The oversight system 106 may not directly execute actions and may not issue authorization artifacts. The oversight system 106 may only return the response 138 to the control layer 112. This configuration may ensure that the oversight system 106 operates within the governance architecture rather than bypassing the control layer 112.

The oversight system 106 may be implemented in various forms. In some embodiments, the oversight system 106 may be implemented as a human review interface for resolving deferred execution requests. A human review interface may present the execution request 128 and associated governance information to a human reviewer who may evaluate the request and provide a resolution determination. The human reviewer may examine the proposed action, the governance classification, and the governance record before returning a response.

In some embodiments, the oversight system 106 may be implemented as a supervisory approval service for resolving deferred execution requests. A supervisory approval service may route deferred execution requests to designated supervisors or approval authorities within an organization. The supervisory approval service may manage approval workflows, track pending requests, and collect approval determinations from authorized supervisors.

In some embodiments, the oversight system 106 may be implemented as a regulated decision console for resolving deferred execution requests. A regulated decision console may provide a specialized interface designed for regulated environments where oversight decisions may be subject to compliance requirements. The regulated decision console may include audit logging, compliance tracking, and regulatory reporting capabilities.

In some embodiments, the oversight system 106 may be implemented as a hybrid system combining automated checks with human confirmation. A hybrid system may perform automated preliminary checks on deferred execution requests and may route requests to human reviewers when automated checks may be inconclusive or when human confirmation may be required. The hybrid system may combine automated efficiency with human judgment for resolution of deferred execution requests.

When routing the execution request 128 to the oversight system 106, the control layer 112 may create an OversightRoutingEvent bound to the ControlID assigned to the execution request 128. The OversightRoutingEvent may record that the execution request 128 has been routed to oversight and may include a timestamp indicating when routing occurred. The OversightRoutingEvent may be associated with the unique identifier of the execution request 128 for traceability.

The control layer 112 may package a resolution bundle containing the execution request 128, the governance classification object produced by the classification module 116, the discrete execution state 132 assigned by the risk state engine 118, and the immutable governance record 134 generated by the documentation module 120. The resolution bundle may provide the oversight system 106 with the information needed to evaluate the deferred execution request and to return an appropriate response.

The oversight system 106 may receive only a read-only copy of the resolution bundle while the execution request 128 may remain in the holding state 126 managed by the control layer 112. The read-only nature of the resolution bundle may prevent the oversight system 106 from modifying the execution request 128, the governance classification object, the discrete execution state 132, or the immutable governance record 134. The execution request 128 may not transfer to the oversight system 106 for execution. Instead, the execution request 128 may remain stored in the holding state 126 and may remain inaccessible to the execution system 108 throughout the oversight process.

The oversight system 106 may return the response 138 to the control layer 112. The response 138 may comprise any one or more response types, in any combination. Examples of response types include, but are not limited to, approve execution, deny execution, and/or request modification. When the response 138 may be approve execution, the control layer 112 may proceed to generate the authorization artifact 136 permitting execution of the execution request 128. When the response 138 may be deny execution, the control layer 112 may permanently withhold the authorization artifact 136 and may mark the execution request 128 as non-executable. When the response 138 may be request modification, the control layer 112 may attach machine-enforceable modification constraints 140 to the execution request 128 as described in connection with step 218 of the method 200.

The control layer 112 validates the response 138 from the oversight system 106 before processing the response 138. As described previously, the oversight system 106 may return the response 138 comprising one of approve execution, deny execution, or request modification. Before the control layer 112 processes the response 138 to determine whether to generate the authorization artifact 136, withhold the authorization artifact 136, or attach machine-enforceable modification constraints 140, the control layer 112 may perform validation checks on the response 138. If the validation fails, the control layer 112 discards the response 138 and maintains the execution request 128 in the holding state 126. The execution request 128 may remain inaccessible to the execution system 108 and may remain in a deferred execution state until a valid response is received.

The response 138 from the oversight system 106 may include a responder identity and/or system identifier for accountability. The responder identity may identify the human reviewer, supervisor, or approval authority who provided the response 138. The system identifier may identify the automated component or service within the oversight system 106 that generated the response 138. The responder identity or system identifier may allow the control layer 112 to verify that the response 138 originated from an authorized source and may provide accountability for oversight decisions. The responder identity or system identifier may be recorded as part of the immutable governance record 134 for traceability.

The response 138 from the oversight system 106 may include optional structured reason codes explaining the decision. Structured reason codes may provide machine-readable explanations for why the oversight system 106 returned a particular response type. For example, structured reason codes may indicate the basis for an approve execution response, the grounds for a deny execution response, or the specific modifications requested in a request modification response. Structured reason codes may support audit and review activities by providing standardized explanations that may be analyzed programmatically. The structured reason codes may be optional, such that the response 138 may be valid with or without structured reason codes.

The validating performed by the control layer 112 may comprise verifying that the execution request 128 is currently in a deferred execution state. This verification may be referred to as ControlID validation. The control layer 112 may verify that the ControlID associated with the response 138 exists in the holding state 126 and that the execution request 128 associated with the ControlID is currently in a deferred execution state. If the ControlID does not exist, or if the execution request 128 is not in a deferred execution state, the validation may fail. ControlID validation may prevent responses from being processed for execution requests that have already been resolved, that have been denied, or that were never routed to oversight.

The validating may comprise verifying that the response 138 conforms to a defined response schema. This verification may be referred to as structural validation. The control layer 112 may verify that the response 138 includes the required fields, that the response type is one of the permitted response types (approve execution, deny execution, or request modification), and that the response 138 conforms to the expected data format. If the response 138 does not conform to the defined response schema, the validation may fail. Structural validation may prevent malformed, incomplete, or improperly formatted responses from being processed by the control layer 112.

The validating may comprise verifying that a responder associated with the response 138 is authorized to issue oversight responses. This verification may be referred to as authorization validation. The control layer 112 may verify that the responder identity or system identifier included in the response 138 corresponds to an entity authorized to provide oversight responses. Authorization may be determined based on predefined authorization lists, role-based access controls, or other authorization mechanisms. If the responder is not authorized to issue oversight responses, the validation may fail. Authorization validation may prevent unauthorized entities from influencing execution decisions through the oversight process.

The validating may comprise verifying that the response type is valid for the current execution state. This verification may be referred to as state consistency validation. The control layer 112 may verify that the response type returned by the oversight system 106 is appropriate given the current state of the execution request 128. For example, the control layer 112 may verify that the execution request 128 is in a deferred execution state before accepting an approve execution, deny execution, or request modification response. If the response type is not valid for the current execution state, the validation may fail. State consistency validation may prevent responses from being processed when the execution request 128 is in an unexpected state.

The validating may comprise verifying that the response 138 has not been duplicated, altered, or replayed. This verification may be referred to as replay and tampering checks. The control layer 112 may verify that the response 138 has not been previously submitted for the same execution request 128, that the response 138 has not been modified since generation by the oversight system 106, and that the response 138 is not a stale response being replayed from a prior oversight interaction. Replay and tampering checks may include verification of timestamps, sequence numbers, cryptographic signatures, or other integrity mechanisms. If the response 138 has been duplicated, altered, or replayed, the validation may fail. Replay and tampering checks may prevent malicious or erroneous resubmission of oversight responses.

When validation fails for any of the validation checks, the control layer 112 may discard the response 138 and may maintain the execution request 128 in the holding state 126. The execution request 128 may remain in the deferred execution state and may remain inaccessible to the execution system 108. The control layer 112 may not process the discarded response and may not generate the authorization artifact 136, withhold the authorization artifact 136, or attach machine-enforceable modification constraints 140 based on the discarded response. The execution request 128 may await a subsequent valid response from the oversight system 106 before resolution may occur.

When validation succeeds, the control layer 112 may append the validated oversight response to the existing immutable governance record 134 with a timestamp. The validated oversight response may be added to the immutable governance record 134 associated with the execution request 128. The timestamp may indicate when the validated oversight response was received and appended to the immutable governance record 134. Appending the validated oversight response to the immutable governance record 134 may create a complete audit trail of the oversight process, including the response type, the responder identity or system identifier, any structured reason codes, and the time of validation. The immutable governance record 134 may reflect the full governance history of the execution request 128, including the oversight resolution. The immutable governance record 134 may be stored in the governance store 110.

When the response 138 from the oversight system 106 may be request modification, the control layer 112 may transition the execution request 128 into a ModificationRequired state. The ModificationRequired state may indicate that the execution request 128 may not proceed to authorization in its current form and that modifications may be required before the execution request 128 may re-enter the governance pipeline. The constraint enforcement module 124 may perform step 218 of the method 200 of FIG. 2 by attaching machine-enforceable modification constraints 140 to the execution request 128 when the oversight response may be request modification. required The machine-enforceable modification constraints 140 may define conditions that a resubmitted execution request 142 may be to satisfy before the resubmitted execution request 142 may be accepted for re-evaluation through the governance steps.

The machine-enforceable modification constraints 140 may comprise various constraint types, in any combination. Examples of constraint types include, but are not limited to, prohibited elements, required removals, mandatory scope restrictions, required disclosures, temporal restrictions, audience limitations, format requirements, approval prerequisites, escalation triggers, conditional permissions, geographic restrictions, data handling requirements, consent verification requirements, and/or attribution requirements. The foregoing examples are illustrative only and do not constitute limitations of the present invention. In some embodiments, the machine-enforceable modification constraints 140 may comprise any one or more of the foregoing constraint types, in any combination. In some embodiments, the machine-enforceable modification constraints 140 may comprise two or more of prohibited elements, required removals, mandatory scope restrictions, and required disclosures. In some embodiments, the machine-enforceable modification constraints 140 may comprise at least one of prohibited elements, required removals, mandatory scope restrictions, or required disclosures. In some embodiments, the machine-enforceable modification constraints 140 may comprise additional or alternative constraint types beyond those specifically enumerated herein.

Prohibited elements may specify content, attributes, or characteristics that may not appear in resubmitted requests. Examples of prohibited elements include, but are not limited to, prohibited phrases, prohibited keywords, prohibited identifiers, prohibited data values, prohibited structural components, prohibited file types, prohibited data formats, prohibited references, prohibited links, prohibited metadata, and/or prohibited classification labels. The foregoing examples are illustrative only and do not constitute limitations of the present invention. In some embodiments, the machine-enforceable modification constraints 140 may include any one or more types of prohibited elements, in any combination. The machine-enforceable modification constraints 140 may include prohibited phrases or elements that may not appear in resubmitted requests. Prohibited phrases or elements may identify specific text strings, keywords, identifiers, data values, or structural components that may not be permitted in a resubmitted execution request 142. When prohibited elements may be attached to the execution request 128, any resubmitted execution request 142 containing the prohibited elements may be rejected by the constraint enforcement module 124 of the control layer 112.

Required removals may specify content, attributes, or characteristics that may be present in the original execution request 128 and that may need to be removed before resubmission. Examples of required removals include, but are not limited to, removal of specific fields, removal of data elements, removal of content portions, removal of personally identifiable information, removal of sensitive data, removal of unauthorized references, removal of non-compliant formatting, removal of prohibited attachments, removal of restricted metadata, and/or removal of flagged content segments. The foregoing examples are illustrative only and do not constitute limitations of the present invention. In some embodiments, the machine-enforceable modification constraints 140 may include any one or more types of required removals, in any combination. Required removals may identify specific portions of the execution request 128 that may be eliminated in any resubmitted execution request 142. The required removals may be expressed as references to specific fields, data elements, or content portions within the execution request 128.

Mandatory scope restrictions may specify limitations on the execution scope that may be selected for resubmitted requests. Examples of mandatory scope restrictions include, but are not limited to, audience size limitations, geographic scope limitations, temporal scope limitations, organizational unit restrictions, user group restrictions, access level restrictions, distribution channel restrictions, visibility restrictions, reach limitations, and/or target population restrictions. The foregoing examples are illustrative only and do not constitute limitations of the present invention. In some embodiments, the machine-enforceable modification constraints 140 may include any one or more types of mandatory scope restrictions, in any combination. Mandatory scope restrictions may require that the execution scope of a resubmitted execution request 142 may be narrower than the original execution scope, may be limited to specific audiences or targets, or may exclude certain scope options. For example, mandatory scope restrictions may require that a resubmitted execution request 142 may be limited to a private audience rather than a public audience, or may be restricted to a defined group rather than a broad population.

Required disclosures may specify labels, notices, or informational elements that may be present in resubmitted requests. Examples of required disclosures include, but are not limited to, AI-generated content labels, source attribution notices, accuracy disclaimers, limitation of liability notices, data source disclosures, algorithmic decision notices, consent acknowledgments, regulatory compliance statements, risk warnings, terms of use references, privacy notices, and/or third-party attribution requirements. The foregoing examples are illustrative only and do not constitute limitations of the present invention. In some embodiments, the machine-enforceable modification constraints 140 may include any one or more types of required disclosures, in any combination. The machine-enforceable modification constraints 140 may include required labels or disclosures that may be present in resubmitted requests. Required labels or disclosures may identify specific text, notices, warnings, attributions, or informational elements that may be included in a resubmitted execution request 142. When required disclosures may be attached to the execution request 128, any resubmitted execution request 142 lacking the required disclosures may be rejected by the constraint enforcement module 124 of the control layer 112.

The machine-enforceable modification constraints 140 may include prohibited execution scopes that may not be selected. Prohibited execution scopes may identify specific scope options that may not be available for resubmitted requests. When prohibited execution scopes may be attached to the execution request 128, any resubmitted execution request 142 specifying a prohibited execution scope may be rejected by the constraint enforcement module 124 of the control layer 112. Prohibited execution scopes may prevent selection of broad distribution options, public visibility settings, or other scope configurations that may have been determined to be inappropriate during oversight review.

The machine-enforceable modification constraints 140 may be bound to the execution request 128 and may remain active until a compliant resubmitted execution request 142 may be received. The constraints may not be advisory text or suggestions. The constraints may be execution gates that may be enforced by the constraint enforcement module 124 of the control layer 112 in step 220 of the method 200 of FIG. 2 and by the user interface 104. The constraint enforcement module 124 may store the machine-enforceable modification constraints 140 in association with the unique identifier of the execution request 128, such that the constraints may be retrieved and applied when evaluating any resubmitted execution request 142.

The constraint enforcement module 124 may enforce the machine-enforceable modification constraints 140 at the control layer 112 level, and the user interface 104 may enforce the machine-enforceable modification constraints 140 at the user interface level. Enforcement may occur at both levels simultaneously to prevent bypass of the constraints. The dual enforcement approach may ensure that non-compliant resubmitted execution requests 142 may be blocked regardless of whether the user interface 104 enforcement mechanisms are circumvented.

The user interface 104 may enforce the machine-enforceable modification constraints 140 by disabling prohibited submission options at the user interface level. When the machine-enforceable modification constraints 140 may include prohibited elements, prohibited execution scopes, or other prohibited options, the user interface 104 may disable the corresponding submission options. For example, if the machine-enforceable modification constraints 140 prohibit selection of a public audience scope, the user interface 104 may disable the public audience option such that the option may not be selected by a user. Disabling prohibited submission options may prevent users from selecting options that would result in non-compliant resubmitted execution requests 142.

The user interface 104 may enforce the machine-enforceable modification constraints 140 by blocking submission if constraints are unmet. When a user may attempt to submit a resubmitted execution request 142 that does not satisfy the machine-enforceable modification constraints 140, the user interface 104 may block the submission. The user interface 104 may evaluate the resubmitted execution request 142 against the machine-enforceable modification constraints 140 before transmitting the resubmitted execution request 142 to the control layer 112. If the resubmitted execution request 142 does not satisfy the constraints, the user interface 104 may prevent the submission from proceeding and may indicate to the user that the constraints are unmet.

The user interface 104 may enforce the machine-enforceable modification constraints 140 by preventing selection of disallowed execution scopes at the user interface level. When the machine-enforceable modification constraints 140 may include mandatory scope restrictions or prohibited execution scopes, the user interface 104 may prevent selection of disallowed scopes. For example, if the machine-enforceable modification constraints 140 require that the execution scope be limited to a followers-only audience, the user interface 104 may prevent selection of broader scope options such as public visibility. Preventing selection of disallowed scopes may ensure that users may only select execution scopes that comply with the machine-enforceable modification constraints 140.

The constraint enforcement module 124 may enforce the machine-enforceable modification constraints 140 at the control layer 112 by rejecting a resubmitted execution request 142 that does not satisfy the machine-enforceable modification constraints 140. When the intake module 114 may receive a resubmitted execution request 142, the constraint enforcement module 124 may evaluate the resubmitted execution request 142 against the machine-enforceable modification constraints 140 associated with the original execution request 128. If the resubmitted execution request 142 does not satisfy the machine-enforceable modification constraints 140, the constraint enforcement module 124 may reject the resubmitted execution request 142.

The constraint enforcement module 124 may reject the resubmitted execution request 142 before assigning a unique identifier to the resubmitted execution request 142. When a non-compliant resubmitted execution request 142 may be received, the control layer 112 may evaluate the resubmitted execution request 142 against the active machine-enforceable modification constraints 140 prior to assigning a ControlID. If the resubmitted execution request 142 does not satisfy the constraints, the control layer 112 may reject the resubmitted execution request 142 without assigning a unique identifier. Rejecting the resubmitted execution request 142 before assigning a unique identifier may prevent non-compliant requests from entering the governance pipeline and may conserve system resources by avoiding unnecessary processing of requests that would be rejected.

A compliant resubmitted execution request 142 may reference the prior ControlID or may include a revision identifier linking the resubmitted execution request 142 to the original execution request 128. When a user may submit a resubmitted execution request 142 that satisfies the machine-enforceable modification constraints 140, the resubmitted execution request 142 may include information associating the resubmitted execution request 142 with the original execution request 128. The reference to the prior ControlID or the revision identifier may allow the control layer 112 to identify that the resubmitted execution request 142 is a modification of a previously deferred execution request 128 rather than an entirely new request. The reference or revision identifier may support traceability between the original execution request 128 and the resubmitted execution request 142.

When the constraint enforcement module 124 may determine that the resubmitted execution request 142 satisfies the machine-enforceable modification constraints 140, the control layer 112 may accept the resubmitted execution request 142 for processing through the governance steps. As described previously, the control layer 112 may perform step 202, step 204, step 206, step 208, and step 210 on the resubmitted execution request 142. The resubmitted execution request 142 may be intercepted, classified, assigned a discrete execution state, documented, and processed for authorization. No prior approval, classification, or authorization from the original execution request 128 may be reused for the resubmitted execution request 142.

When a resubmitted execution request 142 satisfies the machine-enforceable modification constraints 140, the control layer 112 may process the resubmitted execution request 142 through the governance steps. As described previously, in response to receiving a resubmitted execution request 142 that satisfies the machine-enforceable modification constraints 140, the control layer 112 may perform step 202, step 204, step 206, step 208, and step 210 of the method 200 of FIG. 2 on the resubmitted execution request 142.

The resubmitted execution request 142 may enter the governance pipeline as a new request subject to independent governance evaluation. The intake module 114 may intercept the resubmitted execution request 142 and may store the resubmitted execution request 142 in the holding state 126 in which the resubmitted execution request 142 may be inaccessible to the execution system 108. The control layer 112 may assign a new unique identifier to the resubmitted execution request 142. The new unique identifier may distinguish the resubmitted execution request 142 from the original execution request 128 and may allow independent tracking through the governance steps.

The classification module 116 may classify the resubmitted execution request 142 based on governance-relevant attributes to identify a governance handling category 130 for the resubmitted execution request 142 in step 204. The classification may evaluate the attributes of the resubmitted execution request 142, which may differ from the attributes of the original execution request 128 due to modifications made to satisfy the machine-enforceable modification constraints 140. The classification module 116 may produce a new governance classification object for the resubmitted execution request 142. The governance classification object from the original execution request 128 may not be reused for the resubmitted execution request 142.

The risk state engine 118 may assign a discrete execution state 132 to the resubmitted execution request 142 by applying governance logic to the governance handling category 130 identified for the resubmitted execution request 142 in step 206. The risk state engine 118 may evaluate the governance handling category 130 of the resubmitted execution request 142 and may determine the appropriate discrete execution state 132 based on the predefined governance rules. The discrete execution state 132 assigned to the original execution request 128 may not be reused for the resubmitted execution request 142. The resubmitted execution request 142 may receive a different discrete execution state 132 than the original execution request 128 if the modifications result in a different governance handling category 130 or if the governance rules produce a different outcome for the modified attributes.

The documentation module 120 may generate an immutable governance record 134 associated with the resubmitted execution request 142 prior to any authorization of the resubmitted execution request 142 in step 208. The documentation module 120 may create a new immutable governance record 134 for the resubmitted execution request 142. The immutable governance record 134 from the original execution request 128 may not be reused for the resubmitted execution request 142. The new immutable governance record 134 may capture the governance classification, the assigned discrete execution state 132, and other governance-relevant information specific to the resubmitted execution request 142. The new immutable governance record 134 may be stored in the governance store 110.

The authorization module 122 may perform authorization handling based on the discrete execution state 132 assigned to the resubmitted execution request 142 in step 210. When the discrete execution state 132 is execution permitted, the authorization module 122 may generate an authorization artifact 136 for the resubmitted execution request 142 in sub-step 212. When the discrete execution state 132 is execution denied, the authorization module 122 may withhold the authorization artifact 136 in sub-step 214. Any authorization artifact 136 generated for the original execution request 128, if any existed, may not be reused for the resubmitted execution request 142. The resubmitted execution request 142 may receive independent authorization handling based on the governance evaluation performed on the resubmitted execution request 142.

No prior approval from the original execution request 128 may be reused for the resubmitted execution request 142. If the original execution request 128 received an approval response from the oversight system 106, that approval may not carry forward to the resubmitted execution request 142. The resubmitted execution request 142 may be evaluated independently, and any oversight routing that may occur for the resubmitted execution request 142 in step 216 may be based on the discrete execution state 132 assigned to the resubmitted execution request 142 rather than on the oversight history of the original execution request 128.

No prior classification from the original execution request 128 may be reused for the resubmitted execution request 142. The governance handling category 130 identified for the original execution request 128 may not determine the governance handling category 130 for the resubmitted execution request 142. The classification module 116 may evaluate the resubmitted execution request 142 based on the governance-relevant attributes present in the resubmitted execution request 142 at the time of classification.

No prior authorization from the original execution request 128 may be reused for the resubmitted execution request 142. Any authorization artifact 136 that may have been generated for the original execution request 128, or any authorization determination that may have been made for the original execution request 128, may not apply to the resubmitted execution request 142. The authorization module 122 may process the resubmitted execution request 142 based on the discrete execution state 132 assigned to the resubmitted execution request 142 and based on the existence of the immutable governance record 134 generated for the resubmitted execution request 142.

The execution system 108 may be configured with a default-deny execution posture that rejects execution requests lacking a valid authorization artifact. Under the default-deny execution posture, the execution system 108 may not perform any action in response to an execution request unless the execution request is accompanied by a valid authorization artifact 136 issued by the control layer 112. The default-deny execution posture may ensure that AI-generated outputs may not produce real-world or externally visible effects without governance approval. When the execution system 108 receives an execution request without a valid authorization artifact 136, the execution system 108 may reject the execution request and may not perform the requested action.

The execution system 108 may comprise various types of systems that perform externally visible actions. In some embodiments, the execution system 108 may comprise a publishing service that performs externally visible actions. A publishing service may publish content to users, distribute information to audiences, post communications to platforms, or make content visible to external parties. Examples of publishing services include, but are not limited to, content management systems, social media posting services, notification delivery systems, email distribution services, website publishing platforms, and/or broadcast distribution systems. The foregoing examples are illustrative only and do not constitute limitations of the present invention.

In some embodiments, the execution system 108 may comprise a transaction processor that performs externally visible actions. A transaction processor may process financial transactions, execute resource transfers, complete purchase orders, authorize payments, or perform other transactional operations that produce externally visible effects. Examples of transaction processors include, but are not limited to, payment processing systems, order fulfillment systems, account management systems, resource allocation systems, access provisioning systems, and/or credential issuance systems. The foregoing examples are illustrative only and do not constitute limitations of the present invention.

Before performing any action, the execution system 108 may mathematically verify that the authorization artifact 136 came from the control layer 112. The execution system 108 may verify the origin of the authorization artifact 136 by validating cryptographic signatures, digital certificates, or other cryptographic verification data included in the authorization artifact 136. The cryptographic verification data may be generated by the control layer 112 using cryptographic keys or credentials that are not accessible to the AI system 102 or to other systems. The execution system 108 may use corresponding verification keys or credentials to confirm that the authorization artifact 136 was generated by the control layer 112. If the execution system 108 may not verify that the authorization artifact 136 originated from the control layer 112, the execution system 108 may reject the authorization artifact 136 and may not perform the requested action.

Before performing any action, the execution system 108 may mathematically verify that the authorization artifact 136 matches the execution request 128. The execution system 108 may compare the execution details contained in the authorization artifact 136 with the execution details of the execution request 128. The authorization artifact 136 may contain the unique identifier assigned to the execution request 128, the permitted action type, the permitted target object, and the permitted execution scope. The execution system 108 may verify that the unique identifier in the authorization artifact 136 corresponds to the execution request 128 being processed, that the action type in the authorization artifact 136 matches the requested action, that the target object in the authorization artifact 136 matches the target of the execution request 128, and that the execution scope in the authorization artifact 136 encompasses the scope of the execution request 128. If any mismatch may be detected between the authorization artifact 136 and the execution request 128, the execution system 108 may reject the authorization artifact 136 and may not perform the requested action.

Before performing any action, the execution system 108 may mathematically verify that the authorization artifact 136 has not expired or been altered. The execution system 108 may evaluate the validity constraints included in the authorization artifact 136, such as time limits or usage limits, to determine whether the authorization artifact 136 remains valid. If the authorization artifact 136 includes a time limit, the execution system 108 may compare the current time against the expiration time specified in the authorization artifact 136. If the current time exceeds the expiration time, the execution system 108 may determine that the authorization artifact 136 has expired and may reject the authorization artifact 136. If the authorization artifact 136 includes a usage limit, the execution system 108 may track the number of times the authorization artifact 136 has been used and may reject the authorization artifact 136 if the usage limit has been reached. The execution system 108 may also verify the integrity of the authorization artifact 136 by validating cryptographic signatures or hash values to confirm that the authorization artifact 136 has not been altered since issuance by the control layer 112. If the integrity verification fails, the execution system 108 may determine that the authorization artifact 136 has been altered and may reject the authorization artifact 136.

When the execution system 108 may successfully verify that the authorization artifact 136 came from the control layer 112, matches the execution request 128, and has not expired or been altered, the execution system 108 may proceed to perform the requested action. The execution system 108 may execute the action specified in the execution request 128 within the scope authorized by the authorization artifact 136. When any verification may fail, the execution system 108 may reject the execution request 128 in accordance with the default-deny execution posture and may not perform the requested action.

In some embodiments, the AI system 102 may comprise a workplace safety system that generates the output as a proposed task assignment for a worker. A workplace safety system may analyze work requirements, worker capabilities, environmental conditions, and safety considerations to generate proposed task assignments that allocate workers to specific tasks within a workplace. The workplace safety system may evaluate factors such as task complexity, hazard exposure, equipment requirements, physical demands, and regulatory compliance when generating proposed task assignments. The proposed task assignments generated by the workplace safety system may be converted into execution requests 128 that are intercepted by the control layer 112 in step 202 of the method 200 of FIG. 2 for governance evaluation before any worker is assigned to any task.

The governance-relevant attributes may comprise training qualification status of the worker relative to requirements of the proposed task assignment. Training qualification status may indicate whether a worker has completed training programs, certifications, competency assessments, or other qualification requirements associated with a particular task or task category. The requirements of the proposed task assignment may specify what training, certifications, or qualifications a worker may need to possess before being assigned to perform the task. The control layer 112 may evaluate the training qualification status of the worker identified in the proposed task assignment against the requirements of the proposed task assignment to determine whether the worker possesses the qualifications associated with the task. When the training qualification status of the worker does not satisfy the requirements of the proposed task assignment, the control layer 112 may assign a discrete execution state 132 of execution denied or execution deferred pending oversight in step 206, thereby preventing the task assignment from executing without appropriate governance resolution.

In some embodiments, the workplace safety system may generate proposed task assignments based on Job Safety Analysis (JSA) documentation. A Job Safety Analysis may identify tasks, associated hazards, and required controls for work activities within a workplace. The JSA documentation may specify training requirements, certification requirements, personal protective equipment requirements, and procedural requirements for each task. When the workplace safety system generates a proposed task assignment, the control layer 112 may classify the execution request 128 in step 204 based on governance-relevant attributes derived from the JSA documentation, including the training qualification status of the worker relative to the JSA-specified requirements of the proposed task assignment.

For example, a workplace safety system may generate a proposed task assignment to assign a worker to operate a forklift in a warehouse environment. The JSA documentation for forklift operation may specify that workers assigned to forklift operation tasks are to possess a valid forklift operator certification and are to have completed hazard awareness training for the specific warehouse environment. The control layer 112 may intercept the proposed task assignment in step 202 and may classify the execution request 128 in step 204 based on governance-relevant attributes including the training qualification status of the identified worker. The classification module 116 may evaluate whether the worker possesses a valid forklift operator certification and whether the worker has completed the required hazard awareness training. Based on the classification, the risk state engine 118 may assign a discrete execution state 132 in step 206. When the worker possesses all required qualifications, the risk state engine 118 may assign a discrete execution state 132 of execution permitted, and the authorization module 122 may generate an authorization artifact 136 in sub-step 212 permitting the task assignment to proceed. When the worker lacks one or more required qualifications, the risk state engine 118 may assign a discrete execution state 132 of execution denied, and the authorization module 122 may withhold the authorization artifact 136 in sub-step 214, thereby preventing the unqualified worker from being assigned to the forklift operation task.

In another example, a workplace safety system may generate a proposed task assignment to assign a worker to perform electrical maintenance on industrial equipment. The JSA documentation for electrical maintenance may specify that workers assigned to electrical maintenance tasks are to possess an electrician certification, are to have completed lockout/tagout training, and are to have completed arc flash safety training. The control layer 112 may intercept the proposed task assignment in step 202 and may evaluate the training qualification status of the identified worker against these requirements. When the worker possesses the electrician certification and the lockout/tagout training but has not completed arc flash safety training, the risk state engine 118 may assign a discrete execution state 132 of execution deferred pending oversight in step 206. The control layer 112 may route the execution request 128 to the oversight system 106 in step 216, where a safety supervisor may evaluate whether the task assignment may proceed with additional safeguards, whether the task assignment may be denied, or whether modifications may be required such as pairing the worker with a qualified mentor or restricting the worker to tasks that do not involve arc flash exposure.

In some embodiments, the governance-relevant attributes for workplace safety task assignments may include additional attributes beyond training qualification status. The governance-relevant attributes may include hazard severity associated with the proposed task, reversibility of potential harm, number of workers affected by the task assignment, regulatory classification of the task, equipment certification requirements, medical clearance status of the worker, experience level of the worker relative to task complexity, and environmental conditions at the work location. The classification module 116 may evaluate any combination of these governance-relevant attributes in step 204 to identify the governance handling category 130 for the proposed task assignment.

The documentation module 120 may generate an immutable governance record 134 for each proposed task assignment prior to any authorization in step 208. The immutable governance record 134 may capture the training qualification status of the worker, the requirements of the proposed task assignment, the governance handling category 130, the discrete execution state 132, and the rule identifiers indicating which governance rules were applied. The immutable governance record 134 may be stored in the governance store 110 and may provide an audit trail demonstrating that governance evaluation occurred before any worker was assigned to any task.

When the oversight system 106 returns a response 138 of request modification for a proposed task assignment, the constraint enforcement module 124 may attach machine-enforceable modification constraints 140 to the execution request 128 in step 218. For example, the machine-enforceable modification constraints 140 may require that the proposed task assignment be modified to assign a different worker who possesses the required qualifications, may require that the task scope be restricted to exclude hazardous components for which the worker lacks training, or may require that the task assignment include a supervision requirement pairing the worker with a qualified supervisor. The user interface 104 may enforce the machine-enforceable modification constraints 140 in step 220 by preventing selection of unqualified workers for tasks requiring specific qualifications and by blocking submission of task assignments that do not satisfy the constraints.

In some embodiments, the AI system 102 may comprise a safety compliance system that generates the output as a proposed safety compliance action for a worksite. A safety compliance system may analyze worksite conditions, regulatory requirements, worker qualifications, hazard assessments, and operational parameters to generate proposed safety compliance actions that address safety obligations at a worksite. The proposed safety compliance actions generated by the safety compliance system may include AI-generated Job Safety Analyses (JSAs), work permits, safety recommendations, hazard mitigation plans, personal protective equipment requirements, emergency response protocols, and compliance verification actions. The proposed safety compliance actions generated by the safety compliance system may be converted into execution requests 128 that are intercepted by the control layer 112 in step 202 of the method 200 of FIG. 2 for governance evaluation before any safety compliance action is executed at the worksite.

The governance-relevant attributes may comprise at least one of jurisdictional regulatory requirements associated with a geolocation of the worksite or worker qualification status relative to task-specific safety requirements. Jurisdictional regulatory requirements associated with a geolocation of the worksite may include federal, state, provincial, regional, municipal, and local safety regulations that apply to the geographic location where the worksite is situated. Different jurisdictions may impose different safety requirements, reporting obligations, permit requirements, training mandates, and compliance standards. The safety compliance system may generate proposed safety compliance actions based on the worksite geolocation, and the control layer 112 may evaluate whether the proposed safety compliance action satisfies the jurisdictional regulatory requirements applicable to that geolocation. Worker qualification status relative to task-specific safety requirements may indicate whether workers at the worksite possess the training, certifications, competencies, medical clearances, and experience levels associated with specific tasks that the proposed safety compliance action addresses.

For example, a safety compliance system may generate a proposed safety compliance action in the form of an AI-generated JSA for confined space entry at a construction worksite located in a particular jurisdiction. The jurisdictional regulatory requirements associated with the geolocation of the worksite may specify that confined space entry requires a written permit, atmospheric monitoring, rescue equipment availability, and workers with confined space entry certification. The control layer 112 may intercept the proposed safety compliance action in step 202 and may classify the execution request 128 in step 204 based on governance-relevant attributes including the jurisdictional regulatory requirements for confined space entry at the worksite geolocation and the worker qualification status of workers identified in the JSA relative to confined space entry certification requirements. When the AI-generated JSA does not address all jurisdictional regulatory requirements or when the identified workers lack confined space entry certification, the risk state engine 118 may assign a discrete execution state 132 of execution denied or execution deferred pending oversight in step 206, thereby preventing the JSA from being approved and executed without appropriate governance resolution.

In another example, a safety compliance system may generate a proposed safety compliance action in the form of an AI-generated work permit for hot work activities at an industrial facility. Hot work activities may include welding, cutting, brazing, and other operations that produce sparks, flames, or heat. The jurisdictional regulatory requirements associated with the geolocation of the industrial facility may specify fire watch requirements, fire extinguisher placement, combustible material clearance distances, and hot work permit documentation requirements. The control layer 112 may intercept the proposed work permit in step 202 and may evaluate whether the AI-generated work permit satisfies the jurisdictional regulatory requirements applicable to the facility geolocation. The classification module 116 may also evaluate the worker qualification status of workers identified in the work permit relative to task-specific safety requirements for hot work, such as welding certification, fire watch training, and hazard communication training in step 204. When the AI-generated work permit satisfies the jurisdictional regulatory requirements and the identified workers possess the required qualifications, the risk state engine 118 may assign a discrete execution state 132 of execution permitted in step 206 and the authorization module 122 may generate an authorization artifact 136 in sub-step 212 permitting the work permit to be issued. When the AI-generated work permit does not satisfy jurisdictional requirements or when workers lack required qualifications, the risk state engine 118 may assign a discrete execution state 132 of execution denied or execution deferred pending oversight.

In another example, a safety compliance system may generate a proposed safety compliance action in the form of an AI-generated safety recommendation for fall protection at a roofing worksite. The jurisdictional regulatory requirements associated with the geolocation of the roofing worksite may specify fall protection requirements based on working height thresholds, guardrail specifications, personal fall arrest system requirements, and training documentation requirements. The control layer 112 may intercept the proposed safety recommendation in step 202 and the classification module 116 may classify the execution request 128 in step 204 based on governance-relevant attributes including the jurisdictional fall protection requirements applicable to the worksite geolocation and the worker qualification status of workers relative to fall protection training requirements. When the AI-generated safety recommendation does not account for jurisdiction-specific height thresholds or when workers have not completed required fall protection training, the control layer 112 may route the execution request 128 to the oversight system 106 in step 216 for resolution prior to any execution of the safety recommendation.

The safety compliance system may generate proposed safety compliance actions that span multiple jurisdictions when worksites are located near jurisdictional boundaries or when work activities cross jurisdictional lines. The control layer 112 may evaluate the jurisdictional regulatory requirements associated with each applicable geolocation and may determine whether the proposed safety compliance action satisfies the requirements of all applicable jurisdictions. When jurisdictional requirements conflict or when the proposed safety compliance action satisfies some jurisdictional requirements but not others, the risk state engine 118 may assign a discrete execution state 132 of execution deferred pending oversight in step 206 to allow human review of the jurisdictional compliance considerations.

The documentation module 120 may generate an immutable governance record 134 for each proposed safety compliance action prior to any authorization in step 208. The immutable governance record 134 may capture the jurisdictional regulatory requirements associated with the geolocation of the worksite, the worker qualification status relative to task-specific safety requirements, the governance handling category 130, the discrete execution state 132, and the rule identifiers indicating which governance rules were applied. The immutable governance record 134 may be stored in the governance store 110 and may provide an audit trail demonstrating that governance evaluation of jurisdictional and qualification requirements occurred before any safety compliance action was executed at the worksite.

When the oversight system 106 returns a response 138 of request modification for a proposed safety compliance action, the constraint enforcement module 124 may attach machine-enforceable modification constraints 140 to the execution request 128 in step 218. For example, the machine-enforceable modification constraints 140 may require that the AI-generated JSA be modified to include additional controls specified by jurisdictional regulatory requirements, may require that the work permit be modified to identify workers who possess the required task-specific qualifications, or may require that the safety recommendation include jurisdiction-specific documentation elements. The user interface 104 may enforce the machine-enforceable modification constraints 140 in step 220 by preventing submission of safety compliance actions that do not satisfy jurisdictional requirements and by blocking selection of workers who lack required task-specific qualifications.

In some embodiments, an authorized execution request 128 may result in an action that triggers another AI system to generate outputs. When a first AI system generates an output that is converted into a first execution request 128, and when execution of the first execution request 128 triggers a second AI system to generate an output that is converted into a second execution request 128, the control layer 112 may govern both execution requests 128 independently while maintaining chain-of-custody information linking the related execution requests 128.

For example, a first AI system may comprise a recommendation engine that generates an output recommending that personalized content be created for a user. The platform may convert this output into a first execution request 128 proposing an action to trigger a content generation system to create the personalized content. The intake module 114 may intercept the first execution request 128 in step 202 of the method 200 of FIG. 2 and may store the first execution request 128 in the holding state 126. The classification module 116 may classify the first execution request 128 in step 204, the risk state engine 118 may assign a discrete execution state 132 in step 206, the documentation module 120 may generate a first immutable governance record 134 in step 208, and the authorization module 122 may generate a first authorization artifact 136 in step 210 when the discrete execution state 132 is execution permitted. The execution system 108 may verify the first authorization artifact 136 and may execute the action, which triggers the content generation system to generate personalized content.

The content generation system, which may comprise a generative model, may generate an output proposing to publish the personalized content to the user. The platform may convert this output into a second execution request 128. The intake module 114 may intercept the second execution request 128 in step 202 and may store the second execution request 128 in the holding state 126 independently of the first execution request 128. The second execution request 128 may be assigned a new ControlID distinct from the ControlID assigned to the first execution request 128. The documentation module 120 may generate a second immutable governance record 134 for the second execution request 128 in step 208, and the second immutable governance record 134 may include chain-of-custody information referencing the ControlID of the first execution request 128 and indicating that the second execution request 128 was generated as a result of the authorized execution of the first execution request 128.

The first authorization artifact 136 generated for the first execution request 128 may not authorize the second execution request 128. The second execution request 128 may be independently classified by the classification module 116 in step 204, assigned a discrete execution state 132 by the risk state engine 118 in step 206, and processed for authorization by the authorization module 122 in step 210. If the risk state engine 118 assigns a discrete execution state 132 of execution permitted to the second execution request 128, the authorization module 122 may generate a second authorization artifact 136 for the second execution request 128. If the risk state engine 118 assigns a discrete execution state 132 of execution denied or execution deferred pending oversight to the second execution request 128, the second execution request 128 may not proceed to execution even though the first execution request 128 was authorized and executed. In this manner, the control layer 112 may govern each AI-to-AI boundary independently, and an authorized execution by an upstream AI system may not automatically authorize execution requests 128 generated by downstream AI systems.

The following walkthrough describes a representative practical use case of the invention in the context of a content moderation platform where an AI system generates recommendations to remove user-generated content.

A social media platform operates a content moderation system that uses an AI system 102 to evaluate user-generated posts and generate recommendations for content removal when posts appear to violate platform policies. The platform has deployed the control layer 112 between the AI system 102 and the execution system 108 to govern content removal actions before they affect users.

A user posts a video to the platform. The AI system 102 analyzes the video and generates an output recommending removal of the video based on a determination that the video may contain policy-violating material. The platform converts this output into an execution request 128 containing the requested action type (remove content), the target identifier (the specific video), the execution scope (the posting user and all viewers), and the source system identifier (the content moderation AI).

The intake module 114 intercepts the execution request 128 before it can reach the execution system 108. The intake module 114 assigns a unique identifier (ControlID) to the execution request 128 and stores the execution request 128 in the holding state 126. At this point, the video remains visible to users on the platform. The execution system 108 cannot access the execution request 128 while it resides in the holding state 126, and the default-deny execution posture prevents any removal action from occurring without a valid authorization artifact 136.

The classification module 116 receives the execution request 128 and evaluates governance-relevant attributes. The classification module 116 determines that the impact domain is public discourse, the affected parties include the content creator and a broad public audience, the reversibility is partially reversible (content can be restored but reputational effects may persist), and the potential risk exposure is elevated due to the public nature of the content and the scale of potential impact. Based on these governance-relevant attributes, the classification module 116 identifies a governance handling category 130 indicating that the execution request 128 requires elevated governance controls.

The risk state engine 118 receives the governance handling category 130 and applies predefined governance rules. The governance rules specify that content removal actions affecting public discourse with broad audience impact and partial reversibility require human oversight before execution. The risk state engine 118 assigns a discrete execution state 132 of execution deferred pending oversight to the execution request 128.

The documentation module 120 generates an immutable governance record 134 capturing the governance classification, the assigned discrete execution state 132, the rule identifiers indicating which governance rules were applied, and a timestamp. The immutable governance record 134 is stored in the governance store 110. This documentation occurs before any authorization decision, ensuring that a record of the governance evaluation exists regardless of the eventual outcome.

Because the discrete execution state 132 is execution deferred pending oversight, the control layer 112 routes the execution request 128 to the oversight system 106. The execution request 128 remains in the holding state 126 during this process, and the video remains visible to users. The oversight system 106 receives a resolution package containing the execution request 128, the governance handling category 130, the discrete execution state 132, and the immutable governance record 134.

A human content reviewer accesses the oversight system 106 and reviews the resolution package. The reviewer examines the video, the AI system's recommendation, and the governance classification. The reviewer determines that while portions of the video may warrant concern, the video also contains newsworthy elements that should not be removed entirely. The reviewer returns a response 138 of request modification through the oversight system 106.

The control layer 112 validates the response 138 before processing it. The control layer 112 verifies that the execution request 128 is currently in a deferred execution state, that the response 138 conforms to the defined response schema, that the reviewer is authorized to issue oversight responses, and that the response 138 has not been duplicated or replayed. The validation succeeds, and the control layer 112 appends the validated oversight response to the immutable governance record 134.

The constraint enforcement module 124 attaches machine-enforceable modification constraints 140 to the execution request 128. The machine-enforceable modification constraints 140 specify that the resubmitted execution request must include a required disclosure (a content warning label rather than full removal), must have a mandatory scope restriction (limiting visibility reduction rather than complete removal), and must exclude prohibited elements (full content removal is not permitted for this request).

The user interface 104 receives the machine-enforceable modification constraints 140 and enforces them at the user interface level. When a platform operator attempts to resubmit the content action, the user interface 104 disables the full removal option, prevents selection of complete content suppression, and requires selection of a content warning approach. If the operator attempts to submit a resubmitted execution request 142 that does not satisfy the constraints, the user interface 104 blocks the submission.

A platform operator uses the user interface 104 to create a resubmitted execution request 142 that applies a content warning label to the video rather than removing it. The resubmitted execution request 142 satisfies the machine-enforceable modification constraints 140 because it includes the required disclosure, respects the mandatory scope restriction, and does not include the prohibited full removal action.

The intake module 114 intercepts the resubmitted execution request 142 and verifies that it satisfies the machine-enforceable modification constraints 140. The constraint enforcement module 124 confirms compliance, and the control layer 112 assigns a new unique identifier to the resubmitted execution request 142. The resubmitted execution request 142 enters the governance pipeline as a new request subject to independent governance evaluation.

The classification module 116 classifies the resubmitted execution request 142 based on its governance-relevant attributes. Because the resubmitted execution request 142 proposes a content warning rather than removal, the impact domain remains public discourse but the affected parties experience reduced impact, and the reversibility is higher because a content warning can be removed more easily than restoring removed content. The classification module 116 identifies a governance handling category 130 reflecting these modified attributes.

The risk state engine 118 applies governance rules to the governance handling category 130 of the resubmitted execution request 142. The governance rules specify that content warning actions with reduced impact and higher reversibility may proceed without additional oversight. The risk state engine 118 assigns a discrete execution state 132 of execution permitted to the resubmitted execution request 142.

The documentation module 120 generates a new immutable governance record 134 for the resubmitted execution request 142, capturing the governance classification, the assigned discrete execution state 132, and the rule identifiers. This new immutable governance record 134 is stored in the governance store 110, creating a complete audit trail that links the original execution request 128, the oversight response, the modification constraints, and the resubmitted execution request 142.

The authorization module 122 verifies that the immutable governance record 134 exists for the resubmitted execution request 142 and that the discrete execution state 132 is execution permitted. The authorization module 122 generates an authorization artifact 136 specific to the resubmitted execution request 142. The authorization artifact 136 contains the unique identifier of the resubmitted execution request 142, the permitted action type (apply content warning), the permitted target object (the specific video), the permitted execution scope, validity constraints including a time limit, and cryptographic verification data.

The execution system 108 receives the resubmitted execution request 142 along with the authorization artifact 136. Before performing any action, the execution system 108 mathematically verifies that the authorization artifact 136 originated from the control layer 112 by validating the cryptographic signature. The execution system 108 verifies that the authorization artifact 136 matches the resubmitted execution request 142 by comparing the unique identifier, action type, target object, and execution scope. The execution system 108 verifies that the authorization artifact 136 has not expired by checking the time limit. All verifications succeed.

The execution system 108 performs the authorized action by applying a content warning label to the video. Users who navigate to the video now see a content warning before viewing. The video remains accessible but includes the disclosure required by the governance process. The content creator retains access to their content, and viewers receive appropriate notice about the content.

Throughout this process, the governance store 110 contains immutable governance records 134 documenting every governance decision. The records demonstrate that the AI system 102 generated a removal recommendation, that the control layer 112 intercepted the execution request 128 before any action occurred, that governance evaluation resulted in oversight routing, that a human reviewer requested modification, that machine-enforceable modification constraints 140 were applied and enforced, that a compliant resubmitted execution request 142 was independently evaluated, and that authorization was granted only after all governance steps completed. This documentation exists before and independent of any execution, providing pre-execution traceability for audit, compliance, and accountability purposes.

Embodiments of the present invention may provide various advantages relating to the governance of AI-initiated execution requests. The following advantages are illustrative and do not constitute limitations of the present invention.

Embodiments of the present invention may provide the advantage that execution is technically impossible unless governance steps complete in a defined order. Under the architecture described herein, an AI-initiated execution request may not reach an execution system unless the execution request has been intercepted, classified, assigned a discrete execution state, documented, and authorized through the control layer. The execution system may be configured with a default-deny execution posture that rejects execution requests lacking a valid authorization artifact. As a result, the architecture may create a technical dependency between governance completion and execution capability. An execution request that has not completed all governance steps may remain in a holding state inaccessible to the execution system, and the execution system may not perform any action in response to such an execution request. This technical dependency may differ from advisory governance approaches where governance recommendations may be bypassed or ignored.

Embodiments of the present invention may provide the advantage that governance occurs before execution rather than retrospectively. Under the architecture described herein, governance evaluation may occur while the execution request resides in a holding state and before any authorization artifact is generated. The classification, risk state determination, documentation, and authorization steps may all complete before the execution system receives a valid authorization artifact permitting execution. This pre-execution governance approach may differ from retrospective governance approaches where audits, reviews, and compliance evaluations occur after AI-driven actions have already executed. Pre-execution governance may allow governance controls to prevent execution of actions that do not satisfy governance conditions, rather than merely documenting or remediating actions after execution has occurred.

Embodiments of the present invention may provide the advantage that documentation is contemporaneous rather than after-the-fact. Under the architecture described herein, an immutable governance record may be generated prior to any authorization of the execution request. The authorization artifact may not be generated unless the immutable governance record exists. This dependency may ensure that documentation of the governance evaluation exists before execution is permitted or denied, rather than being created retrospectively after execution has occurred. Contemporaneous documentation may provide a record of the governance state at the time of evaluation, which may support audit, compliance, and accountability activities. Contemporaneous documentation may also reduce the risk of documentation being created or modified after execution to reflect a governance evaluation that did not actually occur prior to execution.

Embodiments of the present invention may provide the advantage that oversight is preventative rather than corrective. Under the architecture described herein, when an execution request is assigned a discrete execution state of execution deferred pending oversight, the execution request may be routed to an oversight system for resolution while the execution request remains in a holding state inaccessible to the execution system. Oversight may occur before any execution, and the oversight system may return a response that determines whether execution is approved, denied, or requires modification. This preventative oversight approach may differ from corrective oversight approaches where oversight reviews occur after execution has already produced effects. Preventative oversight may allow human reviewers or supervisory processes to intervene before actions affect individuals, resources, or systems, rather than attempting to remediate effects after execution has occurred.

Embodiments of the present invention may provide the advantage that execution authority is explicitly controlled through authorization artifacts. Under the architecture described herein, execution may occur only when the control layer generates an authorization artifact and the execution system successfully verifies the authorization artifact. The authorization artifact may be a machine-verifiable data object containing cryptographic or structural verification data that the execution system verifies before performing any action. The authorization artifact may be specific to a particular execution request and may include validity constraints such as time limits or usage limits. This explicit control of execution authority may differ from implicit authorization approaches where execution may occur by default unless specifically blocked. Explicit authorization through authorization artifacts may ensure that execution authority is affirmatively granted by the control layer rather than assumed or inferred.

Embodiments of the present invention may provide the advantage that the architecture creates a mandatory execution dependency ensuring AI systems cannot self-authorize. Under the architecture described herein, the AI system may generate outputs that are converted into execution requests, but the AI system may not generate authorization artifacts. Authorization artifacts may be generated exclusively by the control layer after governance steps have completed. The AI system may not bypass the control layer to authorize its own outputs for execution. This separation between output generation and execution authorization may ensure that AI systems may generate outputs freely while execution authority remains under the control of the governance architecture.

Embodiments of the present invention may provide the advantage that execution systems cannot act without valid authorization artifacts. Under the architecture described herein, execution systems may be configured with a default-deny execution posture that rejects execution requests lacking a valid authorization artifact. The execution system may mathematically verify that the authorization artifact originated from the control layer, matches the execution request, and has not expired or been altered before performing any action. If any verification fails, the execution system may reject the execution request and may not perform the requested action. This configuration may ensure that execution systems may not act on AI-generated outputs unless the control layer has evaluated the execution request, applied governance logic, and issued a valid authorization artifact permitting execution.

Embodiments of the present invention address a technical problem arising in computing systems where artificial intelligence systems generate outputs that are interpreted as instructions to perform actions. In such computing systems, the technical problem is that AI-initiated actions may execute without prior governance completion, resulting in computing systems that perform externally visible actions before governance evaluation has occurred. This technical problem manifests in computing architectures where AI system outputs are routed directly to execution components, allowing actions to occur immediately without intermediate control mechanisms. The technical problem is not a business problem or a policy problem, but rather a problem in the configuration and operation of computing systems that process AI-generated outputs.

One technical problem may be characterized as the absence of a machine-enforced execution dependency between governance completion and execution capability in computing systems that process AI-initiated actions. In computing systems lacking such an execution dependency, execution components may act on AI-generated outputs regardless of whether governance evaluation has occurred. The computing system may lack a technical mechanism that prevents execution components from performing actions until governance steps have completed. As a result, the computing system may execute AI-initiated actions in a state where governance evaluation has not occurred, is incomplete, or has produced a determination that execution is not permitted.

Embodiments of the present invention provide a technical solution to this technical problem through a control layer architecture positioned between AI systems and execution systems within a computing environment. The control layer architecture intercepts execution requests generated from AI system outputs before the execution requests reach execution systems. The control layer architecture maintains execution requests in holding states where the execution requests are inaccessible to execution systems. The control layer architecture applies governance logic to execution requests to determine execution eligibility. The control layer architecture generates machine-verifiable authorization artifacts when governance evaluation permits execution. The control layer architecture enforces modification constraints when governance evaluation requires modifications before execution may be reconsidered.

The technical solution operates through specific technical mechanisms within the computing system. The control layer intercepts execution requests at a control point positioned between AI systems and execution systems, preventing direct routing of AI-generated outputs to execution components. The holding state maintained by the control layer stores execution requests in a data structure that is inaccessible to execution systems, such that execution systems may not retrieve or act upon execution requests while the execution requests reside in the holding state. The governance logic applied by the control layer comprises rule-based evaluation mechanisms that process governance-relevant attributes of execution requests and produce discrete execution states indicating whether execution is permitted, denied, or deferred pending oversight.

The authorization artifact generated by the control layer is a machine-verifiable data object that execution systems verify before performing any action. The authorization artifact contains cryptographic or structural verification data that allows execution systems to mathematically verify that the authorization artifact originated from the control layer, matches the specific execution request, and has not expired or been altered. The authorization artifact may include validity constraints such as time limits or usage limits that bound the temporal or usage scope of the authorization. The authorization artifact is specific to a particular execution request and may not be reused for other execution requests.

The modification constraints enforced by the control layer are machine-enforceable rules that define conditions for resubmitted execution requests. The modification constraints are enforced at multiple levels within the computing system, including at user interface components that prevent submission of non-compliant requests and at the control layer that rejects non-compliant requests before assigning unique identifiers. The modification constraints operate as execution gates that prevent resubmitted execution requests from entering the governance pipeline unless the resubmitted execution requests satisfy the constraint conditions.

One technical effect produced by embodiments of the present invention is that execution becomes physically impossible without governance completion through system configuration, state transitions, and authorization verification. The system configuration establishes a default-deny execution posture in execution systems, such that execution systems reject execution requests lacking valid authorization artifacts. The state transitions within the control layer move execution requests through defined governance states, where execution requests may not transition to an authorized state without completing prior governance steps. The authorization verification performed by execution systems mathematically confirms that authorization artifacts are valid before any action is performed.

The technical effect may manifest as a structural dependency within the computing system between governance completion and execution capability. An execution request that has not completed governance steps remains in a holding state and does not receive an authorization artifact. An execution system that does not receive a valid authorization artifact rejects the execution request and does not perform the requested action. This structural dependency is enforced by the configuration of computing components rather than by advisory policies or procedural guidelines. The computing system is configured such that the sequence of governance steps and the generation of authorization artifacts are prerequisites to execution, and execution components are configured to verify these prerequisites before acting.

The technical effect may further manifest as prevention of unauthorized execution through cryptographic verification mechanisms. The authorization artifact contains cryptographic verification data that execution systems use to verify authenticity and integrity. If an authorization artifact is forged, modified, or replayed, the cryptographic verification performed by the execution system fails, and the execution system rejects the execution request. This cryptographic verification provides a technical mechanism that prevents bypass of the governance architecture through manipulation of authorization artifacts.

The technical effect may additionally manifest as enforcement of modification requirements through machine-enforceable constraints. When governance evaluation determines that modifications are required before execution may be reconsidered, the control layer attaches machine-enforceable modification constraints that are enforced by computing components at multiple levels. User interface components disable prohibited options and block submission of non-compliant requests. The control layer rejects non-compliant resubmitted requests before assigning unique identifiers. This multi-level enforcement ensures that modification requirements are satisfied through technical mechanisms rather than through reliance on user compliance with advisory guidance.

Embodiments of the present invention claim a specific machine architecture, data flow, and execution control mechanism rather than an abstract idea, policy, or mental process. The architecture comprises computing components configured to intercept execution requests, maintain execution requests in holding states, apply governance logic, generate authorization artifacts, and verify authorization artifacts before execution. These computing components operate through defined data flows where execution requests pass through a sequence of processing stages, and where authorization artifacts are transmitted from a control layer to execution systems for verification. The execution control mechanism enforces dependencies between governance completion and execution capability through the configuration of computing components and the verification of machine-readable authorization data.

In some embodiments, the architecture enforces execution control through system configuration. Execution systems are configured with a default-deny execution posture that rejects execution requests lacking valid authorization artifacts. This configuration is a technical setting of the execution system that determines how the execution system responds to incoming execution requests. The configuration is not a policy statement or a procedural guideline, but rather a technical parameter that governs the behavior of the execution system at runtime. When an execution request arrives at an execution system without a valid authorization artifact, the execution system rejects the execution request as a direct consequence of the default-deny configuration. The execution system does not evaluate whether to apply the default-deny posture on a case-by-case basis; rather, the default-deny posture is a persistent configuration that applies to all execution requests processed by the execution system.

In some embodiments, the architecture enforces execution control through state transitions. Execution requests transition through defined states within the control layer, including an initial holding state, classification states, risk determination states, documentation states, and authorization states. These state transitions are governed by the completion of processing steps within the control layer. An execution request may not transition from a holding state to an authorized state without completing intermediate governance steps. The state transitions are enforced by the control layer architecture, which processes execution requests through a defined sequence and which does not advance execution requests to subsequent states until prior states have been completed. The state transitions are not advisory or discretionary; rather, the control layer is configured such that execution requests may only occupy states for which the prerequisites have been satisfied.

In some embodiments, the architecture enforces execution control through authorization verification. Execution systems verify authorization artifacts before performing any action. The verification comprises mathematical operations that confirm the authenticity, integrity, and validity of authorization artifacts. The execution system verifies that the authorization artifact originated from the control layer by validating cryptographic signatures or other cryptographic verification data. The execution system verifies that the authorization artifact matches the execution request by comparing identifiers, action types, target objects, and execution scopes. The execution system verifies that the authorization artifact has not expired by evaluating validity constraints such as time limits or usage limits. These verification operations are performed by the execution system as a prerequisite to execution, and the execution system does not perform any action unless all verification operations succeed.

Embodiments of the present invention improve computer operation by enforcing a mandatory execution dependency in which AI-initiated actions may not be executed unless a control-layer-issued authorization artifact exists. This improvement addresses a technical deficiency in computing systems where AI system outputs are routed directly to execution components without intermediate governance controls. In such computing systems, execution components may act on AI-generated outputs immediately upon receipt, without any technical mechanism ensuring that governance evaluation has occurred. Embodiments of the present invention improve the operation of such computing systems by interposing a control layer that intercepts AI-initiated execution requests, applies governance logic, and issues authorization artifacts that execution systems verify before acting.

The mandatory execution dependency may improve computer operation by preventing unauthorized execution prior to governance resolution. In computing systems lacking the mandatory execution dependency, execution may occur in states where governance evaluation has not occurred, is incomplete, or has produced a determination that execution is not permitted. Embodiments of the present invention improve the operation of such computing systems by ensuring that execution may not occur unless governance evaluation has completed and has resulted in issuance of an authorization artifact. The improvement is technical in nature because the improvement relates to the configuration and operation of computing components rather than to business policies or human procedures. The improvement manifests in the behavior of the computing system, where execution requests that have not received authorization artifacts are rejected by execution systems configured with a default-deny execution posture.

In some embodiments, the mandatory execution dependency is enforced through technical mechanisms rather than through advisory guidance or procedural requirements. The control layer intercepts execution requests at a technical control point positioned between AI systems and execution systems. The holding state maintained by the control layer stores execution requests in data structures that are inaccessible to execution systems. The authorization artifacts generated by the control layer contain cryptographic verification data that execution systems use to verify authenticity and integrity. The execution systems are configured to reject execution requests that lack valid authorization artifacts or that present authorization artifacts that fail verification. These technical mechanisms operate at runtime within the computing system and enforce the mandatory execution dependency through the configuration and operation of computing components.

Embodiments of the present invention do not preempt governance of AI systems generally. The architecture governs execution of AI-initiated actions through a specific technical mechanism involving interception, holding, classification, risk state determination, documentation, authorization, and verification. Other approaches to AI governance that do not employ this specific technical mechanism are not preempted. The architecture does not claim governance as an abstract concept, but rather claims a specific machine architecture that enforces governance through defined computing components, data flows, and verification operations.

Embodiments of the present invention are not a mental process or a process that could be performed in the human mind. The architecture comprises computing components that perform operations on machine-readable data objects, including execution requests, governance classification objects, risk state objects, governance records, and authorization artifacts. These operations involve data processing, state management, cryptographic operations, and verification procedures that are performed by computing components at runtime. The operations are not analogous to mental processes because the operations involve manipulation of machine-readable data structures, cryptographic verification of digital signatures, and enforcement of execution dependencies through system configuration.

Embodiments of the present invention are not an abstract idea of controlling AI execution. The architecture claims specific technical mechanisms for controlling AI execution, including a control layer positioned between AI systems and execution systems, a holding state that stores execution requests in a state inaccessible to execution systems, governance logic that assigns discrete execution states to execution requests, authorization artifacts that contain cryptographic verification data, and execution systems configured with a default-deny execution posture. These specific technical mechanisms distinguish the architecture from an abstract idea of controlling AI execution by defining how control is achieved through the configuration and operation of computing components.

In some embodiments, one or more steps of the method 200 of FIG. 2 may be omitted while still achieving governance of execution requests generated by an artificial intelligence system.

In some embodiments, step 216 may be omitted. When step 216 is omitted, the control layer 112 may not route execution requests to the oversight system 106 for resolution. In such embodiments, the risk state engine 118 may assign discrete execution states of execution permitted or execution denied, but may not assign a discrete execution state of execution deferred pending oversight. The method 200 would proceed from step 208 directly to step 210, where the authorization module 122 generates the authorization artifact 136 when the discrete execution state 132 is execution permitted or withholds the authorization artifact 136 when the discrete execution state 132 is execution denied. When step 216 is omitted, steps 218 and 220 may also be omitted because the response 138 of request modification that triggers attachment and enforcement of machine-enforceable modification constraints 140 originates from the oversight system 106.

In some embodiments, steps 218 and 220 may be omitted while step 216 is retained. When steps 218 and 220 are omitted, the oversight system 106 may return a response 138 comprising one of approve execution or deny execution, but may not return a response 138 of request modification. In such embodiments, the method 200 would proceed from step 216 to generation of the authorization artifact 136 when the response 138 is approve execution, or to withholding of the authorization artifact 136 when the response 138 is deny execution. The control layer 112 would not attach machine-enforceable modification constraints 140 to execution requests, and resubmitted execution requests 142 would not be subject to constraint enforcement.

In some embodiments, step 204 may be omitted. When step 204 is omitted, the control layer 112 may not classify the execution request 128 based on governance-relevant attributes to identify a governance handling category 130. In such embodiments, the risk state engine 118 may apply governance logic directly to attributes of the execution request 128 without an intermediate classification step. The method 200 would proceed from step 202 directly to step 206, where the risk state engine 118 assigns the discrete execution state 132 based on the execution request 128 rather than based on a governance handling category 130.

In some embodiments, step 208 may be omitted. When step 208 is omitted, the control layer 112 may not generate an immutable governance record 134 prior to authorization. In such embodiments, the method 200 would proceed from step 206 directly to step 210, where the authorization module 122 performs authorization handling based on the discrete execution state 132. When step 208 is omitted, the governance store 110 may not contain immutable governance records 134 documenting governance evaluation prior to authorization, and the dependency requiring that the authorization artifact 136 not be generated unless the immutable governance record 134 exists may not be enforced.

In some embodiments, steps of the method 200 of FIG. 2 may be performed in sequences other than that shown in FIG. 2 while still achieving governance of execution requests generated by an artificial intelligence system.

In some embodiments, step 208 may be performed before step 206. When step 208 is performed before step 206, the documentation module 120 may generate an immutable governance record 134 capturing the governance handling category 130 prior to the risk state engine 118 assigning the discrete execution state 132. In such embodiments, the immutable governance record 134 may be updated or supplemented after step 206 to include the assigned discrete execution state 132. Alternatively, the documentation module 120 may generate a preliminary governance record after step 204 and generate a complete immutable governance record 134 after step 206. The method 200 would proceed from step 204 to step 208, then to step 206, and then to step 210.

In some embodiments, step 204 and step 206 may be performed concurrently. When step 204 and step 206 are performed concurrently, the classification module 116 may classify the execution request 128 based on governance-relevant attributes while the risk state engine 118 applies governance logic to determine the discrete execution state 132. In such embodiments, the risk state engine 118 may receive governance-relevant attributes directly from the execution request 128 and may apply governance logic to those attributes in parallel with the classification module 116 identifying the governance handling category 130. The discrete execution state 132 produced by the risk state engine 118 may be validated against the governance handling category 130 produced by the classification module 116 to ensure consistency.

In some embodiments, step 202 may be performed in multiple phases. When step 202 is performed in multiple phases, the intake module 114 may intercept the execution request 128 in a first phase and may store the execution request 128 in the holding state 126 in a second phase. In such embodiments, preliminary validation or filtering of the execution request 128 may occur between the first phase and the second phase. The method 200 would proceed through the phases of step 202 before advancing to step 204.

In some embodiments, step 210 may be performed iteratively with step 216. When step 210 is performed iteratively with step 216, the authorization module 122 may perform a preliminary authorization evaluation before routing the execution request 128 to the oversight system 106, and may perform a final authorization evaluation after receiving the response 138 from the oversight system 106. In such embodiments, the preliminary authorization evaluation may determine whether oversight routing is required, and the final authorization evaluation may generate or withhold the authorization artifact 136 based on the response 138.

In some embodiments, steps 218 and 220 may be performed in reverse order. When steps 218 and 220 are performed in reverse order, the control layer 112 may first configure the user interface 104 to enforce modification constraints at the user interface level in step 220, and may then attach the machine-enforceable modification constraints 140 to the execution request 128 in step 218. In such embodiments, the user interface 104 may receive constraint specifications before the constraints are formally bound to the execution request 128, allowing the user interface 104 to begin enforcing constraints while the constraint enforcement module 124 completes the attachment process.

In some embodiments, one or more steps of the method 200 of FIG. 2 may be performed using background processing. Background processing may allow certain governance operations to be performed asynchronously, in parallel with other operations, or during periods of reduced system load. Background processing may improve system responsiveness, reduce latency for time-sensitive operations, and optimize resource utilization within the control layer 112.

In some embodiments, step 204 may be performed using background processing. When step 204 is performed using background processing, the classification module 116 may classify the execution request 128 based on governance-relevant attributes asynchronously after the intake module 114 has stored the execution request 128 in the holding state 126 in step 202. The intake module 114 may acknowledge receipt of the execution request 128 and may queue the execution request 128 for classification by the classification module 116. The classification module 116 may process queued execution requests in the background, identifying governance handling categories 130 for multiple execution requests concurrently. Background processing of step 204 may reduce intake latency by allowing the intake module 114 to accept new execution requests without waiting for classification to complete. The execution request 128 may remain in the holding state 126 and may remain inaccessible to the execution system 108 throughout background classification.

In some embodiments, step 208 may be performed using background processing. When step 208 is performed using background processing, the documentation module 120 may generate the immutable governance record 134 asynchronously after the risk state engine 118 has assigned the discrete execution state 132 in step 206. The documentation module 120 may queue governance record generation tasks and may process the tasks in the background. The authorization module 122 may wait for confirmation that the immutable governance record 134 exists before generating the authorization artifact 136, thereby maintaining the dependency between documentation and authorization while allowing documentation to occur asynchronously. Background processing of step 208 may reduce the time between risk state determination and authorization handling by allowing documentation to proceed in parallel with preparation for authorization.

In some embodiments, storage of the immutable governance record 134 in the governance store 110 may be performed using background processing. When storage is performed using background processing, the documentation module 120 may generate the immutable governance record 134 and may queue the immutable governance record 134 for asynchronous storage in the governance store 110. The documentation module 120 may provide a confirmation to the authorization module 122 that the immutable governance record 134 has been generated, allowing authorization handling to proceed while storage completes in the background. Background storage may improve throughput when the governance store 110 experiences high write latency or when multiple execution requests require concurrent documentation.

In some embodiments, validation of the response 138 from the oversight system 106 may be performed using background processing. When validation is performed using background processing, the control layer 112 may receive the response 138 and may queue the response 138 for asynchronous validation. The validation may include verifying that the execution request 128 is currently in a deferred execution state, verifying that the response 138 conforms to a defined response schema, verifying that a responder associated with the response 138 is authorized to issue oversight responses, and verifying that the response 138 has not been duplicated, altered, or replayed. Background validation may allow the control layer 112 to process multiple oversight responses concurrently and may reduce blocking when validation involves external lookups or cryptographic operations.

In some embodiments, enforcement of the machine-enforceable modification constraints 140 at the control layer 112 level in step 220 may be performed using background processing. When enforcement is performed using background processing, the constraint enforcement module 124 may evaluate resubmitted execution requests 142 against the machine-enforceable modification constraints 140 asynchronously. The intake module 114 may receive the resubmitted execution request 142 and may queue the resubmitted execution request 142 for background constraint evaluation. The resubmitted execution request 142 may remain in a pending state until the constraint enforcement module 124 completes evaluation and determines whether the resubmitted execution request 142 satisfies the machine-enforceable modification constraints 140. Background enforcement may improve intake throughput by allowing the intake module 114 to accept multiple resubmitted execution requests 142 without blocking on constraint evaluation.

Background processing may provide benefits including improved system throughput, reduced latency for synchronous operations, better resource utilization during periods of variable load, and increased resilience to temporary delays in downstream components. Background processing may allow the control layer 112 to handle bursts of execution requests by queuing governance operations and processing the operations as resources become available. Background processing may also allow computationally intensive operations, such as cryptographic verification or complex governance rule evaluation, to be performed without blocking time-sensitive intake or authorization operations.

Any functions disclosed herein may be implemented using one or more suitable machine learning models of any kind. As used herein, the term "machine learning model" refers to a model that has been trained using machine learning. Machine learning models may be trained using any of a variety of machine learning techniques, such as supervised learning, unsupervised learning, semi-supervised learning, self-supervised learning, reinforcement learning, and/or any combination thereof.

Any machine learning model disclosed herein may be of any type. Examples of machine learning model architectures include, but are not limited to, any one or more of the following, in any combination: neural networks (including feedforward neural networks, convolutional neural networks (CNNs), recurrent neural networks (RNNs), long short-term memory networks (LSTMs), gated recurrent units (GRUs), transformer networks, graph neural networks, and spiking neural networks); decision trees; random forests; gradient boosting models (such as XGBoost, LightGBM, and Cat-Boost); support vector machines; Bayesian models; ensemble models; autoencoders (including variational autoencoders); generative adversarial networks (GANs); diffusion models; flow-based models; energy-based models; Boltzmann machines; Hopfield networks; radial basis function networks; self-organizing maps; and mixture models.

Any machine learning model referred to herein may be contained within an embodiment of the present invention or be external to an embodiment of the invention. If external, embodiments of the invention may provide input to and receive output from the machine learning model using a suitable interface, such as an API. For example, the AI system 102 may comprise a machine learning model that generates outputs converted into execution requests 128, and the AI system 102 may be external to the control layer 112 while communicating with the control layer 112 through an API or other interface.

Although the disclosure herein may refer to "a machine learning model," it should be understood that embodiments of the present invention may use a plurality of machine learning models. As a result, any disclosure herein of performing multiple operations using a machine learning model should be understood to include either using the same machine learning model to perform those multiple operations or using different machine learning models to perform those multiple operations. Embodiments of the present invention may select a particular machine learning model to perform any operation disclosed herein in any suitable manner, such as automatically or based on input from a user which selects a particular machine learning model for use. For example, the AI system 102 may comprise multiple machine learning models, such as a content ranking system, a recommendation engine, a moderation classifier, a generative model, a decision support system, and/or an automated approval engine, each of which may generate outputs that are converted into execution requests 128 and intercepted by the control layer 112.

A language model, as disclosed herein, may be an example of a machine learning model. As a result, any disclosure herein relating to machine learning models is equally applicable to language models, and any disclosure herein relating to language models is equally applicable to machine learning models more generally, unless otherwise specified. For example, the AI system 102 may comprise a language model that generates text outputs, recommendations, or decisions that are converted into execution requests 128 for governance evaluation by the control layer 112.

Any machine learning model disclosed herein may, for example, be or include a multimodal model. As used herein, a "multimodal model" refers to a machine learning model that is configured to process input in a plurality of modalities and/or generate output in a plurality of modalities. Examples of input modalities include, but are not limited to, any one or more of the following, in any combination: text, images, video, audio, speech, sensor data, time series data, structured data, code, documents, and embeddings. Examples of output modalities include, but are not limited to, any one or more of the following, in any combination: text, images, video, audio, speech, structured data, code, embeddings, classifications, predictions, and control signals. A multimodal model may, for example, receive input in a first modality and generate output in a second modality different from the first modality. A multimodal model may, for example, receive input in a plurality of modalities simultaneously and generate output based on the combined input. Examples of multimodal model architectures include, but are not limited to, vision-language models, audio-language models, video-language models, and any-to-any models capable of processing and generating content across multiple modalities. For example, the AI system 102 may comprise a multimodal model that analyzes video content and generates a moderation recommendation, which is converted into an execution request 128 proposing content removal or content warning actions that are governed by the control layer 112.

Any machine learning model disclosed herein may be used by one or more software components to perform the functions disclosed herein. Such software components may be referred to as an inference engine, a model runtime, a model serving system, a model application, and/or a model service. The inference engine may load the machine learning model into memory, receive input, invoke the machine learning model to process the input, and return output generated by the machine learning model. References herein to a machine learning model performing functions may encompass an inference engine using the machine learning model to perform such functions. As a particular example, a language model inference engine may load a language model into memory, receive input, invoke the language model to process the input, and return output generated by the language model. References herein to a language model performing functions may encompass a language model inference engine using the language model to perform such functions. In the context of the present invention, the AI system 102 may comprise an inference engine that invokes a machine learning model to generate outputs, and the platform may convert those outputs into execution requests 128 that are intercepted by the intake module 114 of the control layer 112.

The inference engine may be implemented using any of a variety of software frameworks and libraries for machine learning inference, such as TensorFlow, PyTorch, ONNX Runtime, TensorRT, Core ML, and/or any other suitable inference framework. The inference engine may execute on any suitable hardware, such as central processing units (CPUs), graphics processing units (GPUs), tensor processing units (TPUs), neural processing units (NPUs), field-programmable gate arrays (FPGAs), application-specific integrated circuits (ASICs), and/or any combination thereof. The inference engine may be deployed locally on a user device, on a server, in a cloud computing environment, at the edge, and/or in any combination of deployment configurations. The governance control architecture described herein may govern execution requests 128 generated by AI systems 102 regardless of the deployment configuration of the underlying machine learning model, such that the control layer 112 may intercept execution requests 128 from AI systems 102 deployed locally, on servers, in cloud computing environments, or at the edge.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

Although terms such as "optimize" and "optimal" may be used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

Embodiments of the present invention may implement real-time processing capabilities in various contexts. As used herein, the term "real-time" may refer to an output being generated within no more than a maximum amount of time of receipt of a corresponding input. Such maximum amounts of time may include, for example, no more than 1 millisecond, no more than 10 milliseconds, no more than 100 milliseconds, no more than 1 second, no more than 5 seconds, no more than 10 seconds, no more than 30 seconds, no more than 1 minute, and/or no more than 5 minutes. For example, the intake module 114 may intercept an execution request 128 and store the execution request 128 in the holding state 126 in real-time upon receipt of the execution request 128 from the AI system 102. The classification module 116 may classify the execution request 128 based on governance-relevant attributes and identify the governance handling category 130 in real-time upon receipt of the execution request 128 from the intake module 114. The risk state engine 118 may assign the discrete execution state 132 to the execution request 128 in real-time upon receipt of the governance handling category 130. The authorization module 122 may generate the authorization artifact 136 in real-time upon determination that the discrete execution state 132 is execution permitted. The execution system 108 may verify the authorization artifact 136 in real-time upon receipt of the authorization artifact 136 from the control layer 112. The constraint enforcement module 124 may evaluate a resubmitted execution request 142 against the machine-enforceable modification constraints 140 in real-time upon receipt of the resubmitted execution request 142.

Embodiments of the present invention may process data structures and perform operations at scales and speeds that demonstrate that embodiments of the present invention are necessarily rooted in computer technology and cannot practically be performed by a human mind. For example, the intake module 114 may intercept and store execution requests 128 at a rate of at least 10,000 execution requests per second. The classification module 116 may classify execution requests 128 comprising at least 10 kilobytes of governance-relevant metadata in less than 100 milliseconds. The risk state engine 118 may apply governance logic comprising at least 1,000 governance rules to determine the discrete execution state 132 in less than 50 milliseconds. The documentation module 120 may generate immutable governance records 134 comprising at least 5 kilobytes of governance data and store the immutable governance records 134 in the governance store 110 in less than 200 milliseconds. The authorization module 122 may generate authorization artifacts 136 containing cryptographic verification data in less than 100 milliseconds. The execution system 108 may mathematically verify authorization artifacts 136 containing cryptographic signatures in less than 50 milliseconds. The constraint enforcement module 124 may evaluate resubmitted execution requests 142 against machine-enforceable modification constraints 140 comprising at least 100 constraint conditions in less than 100 milliseconds.

Unless expressly and specifically stated otherwise in this specification, the omission from this specification of any subject matter, terminology, embodiments, examples, features, elements, steps, or other content that was disclosed in any application to which this application claims priority (including, but not limited to, any provisional application) is not intended to disclaim, surrender, or narrow the scope of any claim term herein. Such omissions are made solely for purposes of brevity, clarity, organization, or drafting preference and shall not be construed as evidencing any intent by the applicant to limit, restrict, or abandon any aspect of the claimed invention or to exclude any interpretation that would otherwise be available based on the incorporated subject matter. The applicant specifically reserves the right to claim the full scope of any invention disclosed in any application incorporated herein by reference or otherwise whose priority or benefit is claimed, whether or not such invention is explicitly redescribed in this specification. Any construction of claim terms should consider the full scope of disclosure available in this specification together with all incorporated applications, and no negative inference should be drawn from any omission of previously disclosed subject matter unless such limitation is expressly and unambiguously set forth in this specification.

What is claimed is:

1. A method performed by at least one computer processor executing computer program instructions stored on at least one non-transitory computer-readable medium, the method comprising:
   (A) intercepting, by a control layer positioned between an artificial intelligence system and an execution system, an execution request generated from an output of the artificial intelligence system, and storing the execution request in a holding state in which the execution request is inaccessible to the execution system, wherein the execution system is configured with a default-deny execution posture that rejects execution requests lacking a valid authorization artifact;
   (B) classifying, by the control layer, the execution request based on governance-relevant attributes to identify a governance handling category for the execution request;
   (C) assigning, by the control layer, a discrete execution state to the execution request by applying governance logic to the governance handling category, wherein the discrete execution state is one of execution permitted, execution denied, or execution deferred pending oversight;
   (D) generating, by the control layer, an immutable governance record associated with the execution request prior to any authorization of the execution request, wherein the authorization artifact is not generated unless the immutable governance record exists;
   (E) performing, by the control layer, one of:
      (E)(1) in response to the discrete execution state being execution permitted, generating the authorization artifact, the authorization artifact being a machine-verifiable data object containing cryptographic or structural verification data that is verified by the execution system before performing any action; or
      (E)(2) in response to the discrete execution state being execution denied, withholding the authorization artifact;
   (F) in response to the discrete execution state being execution deferred pending oversight, routing, by the control layer, the execution request to an oversight system, wherein the execution request remains in the holding state during oversight, and wherein the oversight system returns a response comprising one of approve execution, deny execution, or request modification;
   (G) in response to the response being request modification, attaching, by the control layer, machine-enforceable modification constraints to the execution request; and
   (H) enforcing the machine-enforceable modification constraints at a user interface level by blocking submission of a resubmitted execution request that does not satisfy the machine-enforceable modification constraints, and enforcing the machine-enforceable modification constraints at the control layer by rejecting a resubmitted execution request that does not satisfy the machine-enforceable modification constraints.

2. The method of claim 1, wherein in response to receiving a resubmitted execution request that satisfies the machine-enforceable modification constraints, (A), (B), (C), (D), and (E) are performed on the resubmitted execution request.

3. The method of claim 1, wherein the machine-enforceable modification constraints comprise two or more of: prohibited elements, required removals, mandatory scope restrictions, and required disclosures.

4. The method of claim 1, wherein the governance-relevant attributes comprise impact domain, affected parties, reversibility, and potential risk exposure.

5. The method of claim 1, wherein a same governance handling category produces a same discrete execution state under same predefined governance rules.

6. The method of claim 1, wherein the control layer validates the response from the oversight system before processing the response, and discards the response and maintains the execution request in the holding state if the validation fails.

7. The method of claim 1, wherein the oversight system cannot directly execute actions and cannot issue authorization artifacts, and can only return the response to the control layer.

8. The method of claim 1, wherein the immutable governance record is stored in a governance store that is append-only, separate from execution system logs, and not writable by the artificial intelligence system or the execution system.

9. The method of claim 1, wherein the authorization artifact comprises validity constraints including at least one of time limits or usage limits.

10. The method of claim 1, wherein the artificial intelligence system comprises a workplace safety system that generates the output as a proposed task assignment for a worker, and wherein the governance-relevant attributes comprise training qualification status of the worker relative to requirements of the proposed task assignment.

11. The method of claim 1, wherein the artificial intelligence system comprises a safety compliance system that generates the output as a proposed safety compliance action for a worksite, and wherein the governance-relevant attributes comprise at least one of jurisdictional regulatory requirements associated with a geolocation of the worksite or worker qualification status relative to task-specific safety requirements.

12. A system comprising at least one non-transitory computer-readable medium having computer program instructions stored thereon, the computer program instructions being executable by at least one computer processor to perform a method, the method comprising:

(A) intercepting, by a control layer positioned between an artificial intelligence system and an execution system, an execution request generated from an output of the artificial intelligence system, and storing the execution request in a holding state in which the execution request is inaccessible to the execution system, wherein the execution system is configured with a default-deny execution posture that rejects execution requests lacking a valid authorization artifact;

(B) classifying, by the control layer, the execution request based on governance-relevant attributes to identify a governance handling category for the execution request;

(C) assigning, by the control layer, a discrete execution state to the execution request by applying governance logic to the governance handling category, wherein the discrete execution state is one of execution permitted, execution denied, or execution deferred pending oversight;

(D) generating, by the control layer, an immutable governance record associated with the execution request prior to any authorization of the execution request, wherein the authorization artifact is not generated unless the immutable governance record exists;

(E) performing, by the control layer, one of:

(E)(1) in response to the discrete execution state being execution permitted, generating the authorization artifact, the authorization artifact being a machine-verifiable data object containing cryptographic or structural verification data that is verified by the execution system before performing any action; or (E)(2) in response to the discrete execution state being execution denied, withholding the authorization artifact;

(F) in response to the discrete execution state being execution deferred pending oversight, routing, by the control layer, the execution request to an oversight system, wherein the execution request remains in the holding state during oversight, and wherein the oversight system returns a response comprising one of approve execution, deny execution, or request modification;

(G) in response to the response being request modification, attaching, by the control layer, machine-enforceable modification constraints to the execution request; and (H) enforcing the machine-enforceable modification constraints at a user interface level by blocking submission of a resubmitted execution request that does not satisfy the machine-enforceable modification constraints, and enforcing the machine-enforceable modification constraints at the control layer by rejecting a resubmitted execution request that does not satisfy the machine-enforceable modification constraints.

13. The system of claim 12, wherein in response to receiving a resubmitted execution request that satisfies the machine-enforceable modification constraints, (A), (B), (C), (D), and (E) are performed on the resubmitted execution request.

14. The system of claim 12, wherein the machine-enforceable modification constraints comprise two or more of: prohibited elements, required removals, mandatory scope restrictions, and required disclosures.

15. The system of claim 12, wherein the governance-relevant attributes comprise impact domain, affected parties, reversibility, and potential risk exposure.

16. The system of claim 12, wherein a same governance handling category produces a same discrete execution state under same predefined governance rules.

17. The system of claim 12, wherein the control layer validates the response from the oversight system before processing the response, and discards the response and maintains the execution request in the holding state if validation fails.

18. The system of claim 12, wherein the oversight system cannot directly execute actions and cannot issue authorization artifacts, and can only return the response to the control layer.

19. The system of claim 12, wherein the immutable governance record is stored in a governance store that is append-only, separate from execution system logs, and not writable by the artificial intelligence system or the execution system.

20. The system of claim 12, wherein the authorization artifact comprises validity constraints including at least one of time limits or usage limits.

21. The system of claim 12, wherein the artificial intelligence system comprises a workplace safety system that generates the output as a proposed task assignment for a worker, and wherein the governance-relevant attributes comprise training qualification status of the worker relative to requirements of the proposed task assignment.

22. The system of claim 12, wherein the artificial intelligence system comprises a safety compliance system that generates the output as a proposed safety compliance action for a worksite, and wherein the governance-relevant attributes comprise at least one of jurisdictional regulatory requirements associated with a geolocation of the worksite or worker qualification status relative to task-specific safety requirements.

\* \* \* \* \*